(12) United States Patent
Zhang et al.

(10) Patent No.: US 12,016,063 B2
(45) Date of Patent: Jun. 18, 2024

(54) COMMUNICATION METHOD AND APPARATUS

(71) Applicant: HUAWEI TECHNOLOGIES CO., LTD., Shenzhen (CN)

(72) Inventors: Chengchen Zhang, Shanghai (CN); Wenfu Wu, Shanghai (CN); Zaifeng Zong, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 371 days.

(21) Appl. No.: 17/356,735

(22) Filed: Jun. 24, 2021

(65) Prior Publication Data
US 2021/0321468 A1 Oct. 14, 2021

Related U.S. Application Data

(63) Continuation of application No. PCT/CN2019/127195, filed on Dec. 20, 2019.

(30) Foreign Application Priority Data

Dec. 27, 2018 (CN) .......................... 201811611661.2

(51) Int. Cl.
*H04W 76/11* (2018.01)
*H04B 7/185* (2006.01)
*H04W 4/40* (2018.01)

(52) U.S. Cl.
CPC ........ *H04W 76/11* (2018.02); *H04B 7/18506* (2013.01); *H04W 4/40* (2018.02)

(58) Field of Classification Search
CPC ....... H04W 76/11; H04W 4/40; H04W 76/12; H04W 4/44; H04W 16/28; H04W 24/10; H04B 7/18506; Y02D 30/70
See application file for complete search history.

(56) References Cited

U.S. PATENT DOCUMENTS

2007/0284474 A1* 12/2007 Olson ................ H04B 7/18504
244/10
2015/0312361 A1* 10/2015 Seo ......................... H04L 67/55
370/329
(Continued)

FOREIGN PATENT DOCUMENTS

CA 3030741 A1 * 10/2018 ......... H04L 63/0272
CN 106909167 A 6/2017
(Continued)

OTHER PUBLICATIONS

Huawei,"ID_UAS-enhancement on initial UAV authorization operation", 3GPP TSG-SA WG1 Meeting #83 S1-182504, West Palm Beach, Aug. 20-24, 2018, total 3 pages.
(Continued)

*Primary Examiner* — Dinh Nguyen
(74) *Attorney, Agent, or Firm* — Maier & Maier, PLLC

(57) ABSTRACT

A communication method and apparatus. According to the communication method, a session management function (SMF) receives a first message sent by a first terminal apparatus. The first message is used to request the SMF to establish a first session for the first terminal apparatus. The first message is further used to indicate that the first session is used for communication between the first terminal apparatus and a second terminal apparatus. The first terminal apparatus and the second terminal apparatus belong to a same unmanned aerial vehicle communication system. Then, the SMF sends address information of the first terminal apparatus to a first management network element based on the first message. This provides a possibility of exchanging address information of terminal apparatuses in an unmanned aerial vehicle communication system.

16 Claims, 13 Drawing Sheets

(56) References Cited

U.S. PATENT DOCUMENTS

| | | |
|---|---|---|
| 2018/0090012 A1 | 3/2018 | Jo et al. |
| 2018/0192471 A1* | 7/2018 | Li .................. H04W 4/60 |
| 2018/0234916 A1 | 8/2018 | Song et al. |
| 2018/0279411 A1 | 9/2018 | Kang et al. |

FOREIGN PATENT DOCUMENTS

| | | | |
|---|---|---|---|
| CN | 108032307 A | 5/2018 | |
| CN | 108366380 A | 8/2018 | |
| CN | 108370600 A | 8/2018 | |
| CN | 108574969 A | 9/2018 | |
| CN | 108632887 A | 10/2018 | |
| CN | 108632953 A | 10/2018 | |
| CN | 108738082 A | 11/2018 | |
| CN | 108738086 A | 11/2018 | |
| CN | 108810941 A | 11/2018 | |
| CN | 108934007 A | 12/2018 | |
| CN | 108934052 A | 12/2018 | |
| CN | 108781476 B | 12/2020 | |
| EP | 2475132 A1 * | 7/2012 | ....... H04L 29/12047 |
| WO | 2018070436 A1 | 4/2018 | |
| WO | 2018144761 A1 | 8/2018 | |

OTHER PUBLICATIONS

Qualcomm Incorporated et al. "New SID on UAS Identification and Tracking." SA WG2 Meeting #129, S2-1813341. Nov. 26-30, 2018. West Palm Beach, Florida. 4 pages.

3GPP. "3rd Generation Partnership Project; Technical Specification Group Services and System Aspects; Remote Identification of Unmanned Aerial Systems; Stage 1 (Release 16)." 3GPP TR 22.825 V16.0.0 (Sep. 2018). 22 pages.

Intel, "FS_ID_UAS: Update Definition and Use case 5.1", 3GPP TSG-SA WG1 Meeting #83, S1-182506, West Palm Beach, Florida, USA, Aug. 20-24, 2018, 3 pages.

* cited by examiner

COMMUNICATION METHOD AND APPARATUS

CROSS-REFERENCE TO RELATED APPLICATIONS

This application is a continuation of International Application No. PCT/CN2019/127195, filed on Dec. 20, 2019. which claims priority to Chinese Patent Application No. 201811611661.2, filed on Dec. 27, 2018. The disclosures of the aforementioned applications are hereby incorporated by reference in their entireties.

TECHNICAL FIELD

The embodiments relate to the field of mobile communication technologies, and in particular, to a communication method and apparatus.

BACKGROUND

In recent years, an unmanned aerial vehicle industry has developed rapidly. A scenario of communication between an unmanned aerial vehicle controller and an unmanned aerial vehicle accordingly changes. Currently, for short-distance control, address information may be exchanged between the unmanned aerial vehicle controller and the unmanned aerial vehicle by using a Bluetooth low energy (BLE) technology, a wireless local area network, and the like, to implement pairing and connection. For long-distance control, especially control in a non-line-of-sight scenario, the unmanned aerial vehicle controller and the unmanned aerial vehicle may need to implement pairing and connection by using a 3rd generation partnership project (3GPP) network. For this scenario, the 3GPP provides a new traffic management entity to manage the address information of the unmanned aerial vehicle controller and the unmanned aerial vehicle.

However, currently in the 3GPP network, the unmanned aerial vehicle controller and the unmanned aerial vehicle are connected to the network only as common terminal apparatuses, and the address information cannot be exchanged between the unmanned aerial vehicle controller and the unmanned aerial vehicle.

SUMMARY

The embodiments provide a communication method and apparatus, to exchange address information between an unmanned aerial vehicle controller and an unmanned aerial vehicle in a 3GPP network.

According to a first aspect, the embodiments provide a communication method. The communication method may be implemented by a session management function (SMF). For example, the SMF may receive a first message sent by a first terminal apparatus. The first message is used to request the SMF to establish a first session for the first terminal apparatus. The first message is further used to indicate that the first session is used for communication between the first terminal apparatus and a second terminal apparatus. The first terminal apparatus and the second terminal apparatus belong to a same unmanned aerial vehicle communication system. Then, the SMF sends address information of the first terminal apparatus to a first management network element based on the first message. The address information of the first terminal apparatus is used to indicate an address of the first terminal apparatus and/or an address of a user plane function (UPF) corresponding to the first terminal apparatus.

By using the foregoing method, after the first message is received and if the first message is used to indicate that the first session is used to indicate the first terminal apparatus and the second terminal apparatus in the same unmanned aerial vehicle communication system to communicate with each other, the SMF sends the address information of the first terminal apparatus to the first management network element. This provides a possibility of exchanging address information of terminal apparatuses in an unmanned aerial vehicle communication system.

In a possible implementation, if the first management network element includes a traffic management entity and after the SMF sends the address information of the first terminal apparatus to the first management network element, the SMF receives address information of the second terminal apparatus from the traffic management entity. The address information of the second terminal apparatus is used to indicate an address of the second terminal apparatus and/or an address of a UPF corresponding to the second terminal apparatus.

In a possible implementation, the SMF may determine a first rule based on the address information of the second terminal apparatus and send the first rule to the UPF corresponding to the first terminal apparatus. The first rule is used to indicate a routing rule from the first terminal apparatus to the second terminal apparatus and/or a data packet filtering rule between the first terminal apparatus and the second terminal apparatus. Alternatively, the SMF may send the address information of the second terminal apparatus to the UPF corresponding to the first terminal apparatus.

In a possible implementation, the SMF may allocate, based on the address information of the second terminal apparatus, a tunnel corresponding to the first session, and send information about the tunnel to the UPF corresponding to the first terminal apparatus. The tunnel is used for the communication between the first terminal apparatus and the second terminal apparatus.

In a possible implementation, the SMF may send a second message to the traffic management entity. The second message is used to subscribe to the address information of the second terminal apparatus. Then, the SMF may receive the address information of the second terminal apparatus from the traffic management entity. In an implementation, the second message may include an identifier of the second terminal apparatus.

In a possible implementation, if the first management network element includes a traffic management entity, the SMF may further send an identifier of a policy control function (PCF), address information of the PCF, or a portion of or all information of the identifier of the second terminal apparatus to the traffic management entity, so that the traffic management entity determines to send address information of the second terminal apparatus to the PCF, to trigger the PCF to generate a session management policy of the first session between the first terminal apparatus and the second terminal apparatus.

In a possible implementation, the first management network element includes a PCF. The SMF may further send an identifier of the second terminal apparatus to the PCF after sending the address information of the first terminal apparatus to the PCF.

In a possible implementation, the SMF may receive a session management policy of the first session from the PCF. The SMF may further determine a second rule according to the session management policy of the first session. The second rule is used to indicate a routing rule from the first terminal apparatus to the second terminal apparatus and/or a data packet filtering rule between the first terminal apparatus and the second terminal apparatus. The SMF may send the second rule to the UPF corresponding to the first terminal apparatus.

In a possible implementation, if the first management network element includes a traffic management entity, the SMF may further receive a first response message from the traffic management entity. The first response message is used to indicate that the traffic management entity completes storage of the address information of the first terminal apparatus.

In addition, if the communication method is implemented by a first terminal apparatus, the first terminal apparatus may generate a first message. The first message may be used to request an SMF to establish a first session for the first terminal apparatus, and the first message is used to indicate that the first session is used for communication between the first terminal apparatus and a second terminal apparatus. The first terminal apparatus and the second terminal apparatus belong to a same unmanned aerial vehicle communication system. Then, the first terminal apparatus may send the first message to the SMF.

In a possible implementation, the first message may further carry an identifier of the second terminal apparatus.

In a possible implementation, after sending the first message, the first terminal apparatus may further receive a response message from the SMF. The response message is used to indicate a result of establishing the first session. For example, the response message may indicate establishment of the first session is completed.

In addition, if the communication method is implemented by a traffic management entity, the traffic management entity may receive address information of a first terminal apparatus from a second management network element. Then, the traffic management entity may store the address information of the first terminal apparatus.

In a possible implementation, the traffic management entity may further send the address information of the first terminal apparatus to an SMF that manages a second terminal apparatus. The first terminal apparatus and the second terminal apparatus belong to a same unmanned aerial vehicle communication system.

In a possible implementation, after receiving a second message sent by the SMF that manages the second terminal apparatus, the traffic management entity may send the address information of the first terminal apparatus. The second message is used to subscribe to the address information of the first terminal apparatus. In an implementation, the second message may carry an identifier of the first terminal apparatus.

In a possible implementation, if the second management network element includes an SMF that manages the first terminal apparatus, after storing the address information of the first terminal apparatus, the traffic management entity may further send address information of a second terminal apparatus to the SMF. In a possible implementation, after receiving a third message sent by the SMF, the traffic management entity may send the address information of the first terminal apparatus. The third message is used to subscribe to the address information of the second terminal apparatus. The third message may include an identifier of the second terminal apparatus.

In a possible implementation, if the traffic management entity receives an identifier of a PCF and/or address information of the PCF from the SMF that manages the first terminal apparatus, the traffic management entity may further send address information of a second terminal apparatus to the PCF. In a possible implementation, after receiving a fourth message sent by the SMF, the traffic management entity may send the address information of the second terminal apparatus to the PCF. The fourth message is used to subscribe to the address information of the second terminal apparatus. The fourth message may include an identifier of the second terminal apparatus.

In a possible implementation, if the second management network element includes a PCF, and after storing the address information of the first terminal apparatus, the traffic management entity may further send address information of a second terminal apparatus to the PCF, so that the PCF generates a session management policy corresponding to the first session. In a possible implementation, after receiving a fifth message sent by the PCF, the traffic management entity may send the address information of the second terminal apparatus to the PCF. The fifth message is used to subscribe to the address information of the second terminal apparatus. The fifth message may include an identifier of the second terminal apparatus.

In addition, if the communication method is implemented by a policy control function PCF, the PCF may receive address information of a second terminal apparatus from a traffic management entity and generate a session management policy of a first session based on the address information. The session management policy may be used to determine a first rule. The first rule is used to indicate a routing rule from a first terminal apparatus to the second terminal apparatus and/or a data packet filtering rule between the first terminal apparatus and the second terminal apparatus. Then, the PCF may send the session management policy of the first session to an SMF that manages the first terminal apparatus.

In a possible implementation, before receiving the address information of the second terminal apparatus from the traffic management entity, the PCF may further receive address information of the first terminal apparatus from the SMF, and send the address information of the first terminal apparatus to the traffic management entity, so that the traffic management entity stores the address information of the first terminal apparatus.

In a possible implementation, before receiving the address information of the second terminal apparatus from the traffic management entity, the PCF may further send a request message to the traffic management entity. The request message may be used to subscribe to the address information of the second terminal apparatus. The request message may include an identifier of the second terminal apparatus.

According to a second aspect, the embodiments provide a communication apparatus. The communication apparatus has a function of implementing the communication method provided in the embodiments by the SMF, the traffic management entity, the PCF, or the user equipment (UE) in the method example in the first aspect. The function may be implemented by hardware or may be implemented by hardware executing corresponding software. The hardware or the software includes one or more modules corresponding to the function.

In a possible implementation, the apparatus includes a transceiver unit and a processing unit. These units may perform corresponding functions in the method example in the first aspect. For details, refer to detailed descriptions in the method example Details are not described herein again.

In another possible implementation, a structure of the apparatus includes a processor, a memory, and a transceiver.

The processor, the memory, and the transceiver may be connected by using a bus or another medium. The processor invokes an instruction stored in the memory, to perform a corresponding function in the method example in the first aspect.

According to a third aspect, an embodiment further provides a computer-readable storage medium. The computer-readable storage medium stores a computer program. When the program is executed by a processor, a computer is enabled to perform the method provided in any one of the first aspect or the implementations of the first aspect.

According to a fourth aspect, an embodiment further provides a computer program product. The computer program product stores an instruction, and when the instruction is run on a computer, the computer is enabled to perform the method provided in any one of the first aspect or the implementations of the first aspect.

According to a sixth aspect, an embodiment provides a chip system. The chip system includes a processor, and may further include a memory, configured to implement the method according to any one of the first aspect or the possible implementations of the first aspect. The chip system may include a chip or may include a chip and another discrete component.

According to a seventh aspect, an embodiment provides a communication system, and the communication system includes the communication apparatus according to the second aspect.

DETAILED DESCRIPTION OF THE EMBODIMENTS

Figure 1:
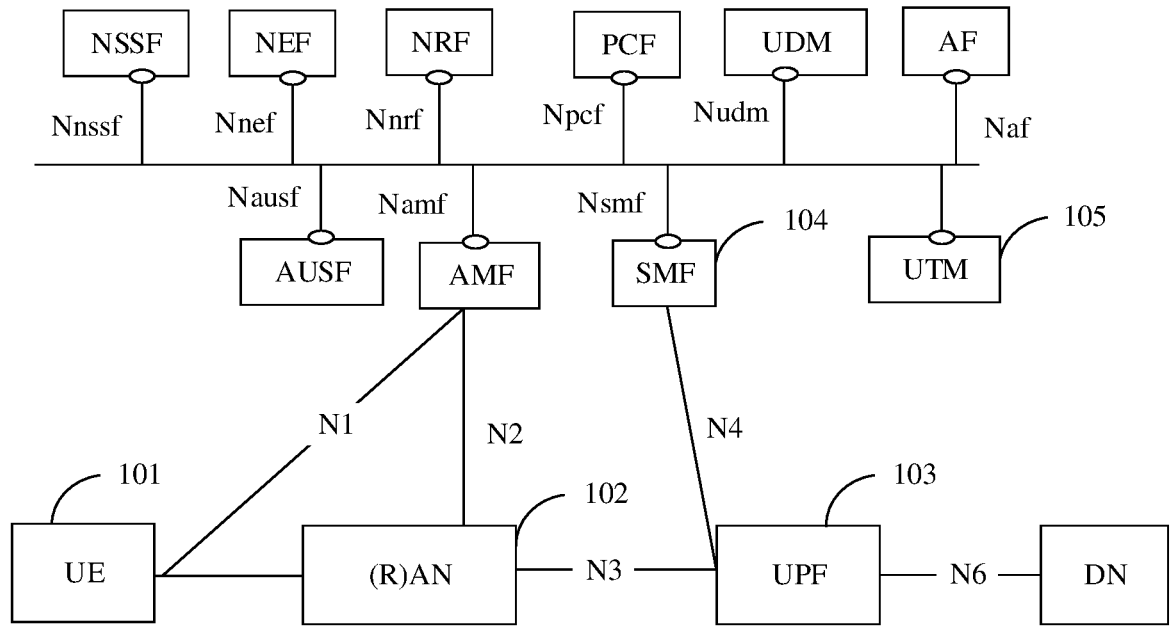
FIG. 1 is a schematic architectural diagram of a communication system according to the embodiments.

To make objectives, solutions, and advantages of the embodiments clearer, the following further describes the embodiments in detail with reference to the accompanying drawings. Any operation method in a method embodiment may also be used in an apparatus embodiment or a system embodiment.

The following explains terms related in the embodiments.

1. At least one means one or more, that is, including one, two, three, or more.
2. A plurality of means two or more, that is, including two, three, or more.
3. Carrying may mean that a message is used to carry information or data or may mean that a message includes information.
4. An unmanned aerial vehicle communication system may also be referred to as an unmanned aerial system (UAS), and is a communication system including at least one unmanned aerial vehicle control apparatus and at least one unmanned aerial vehicle apparatus. An unmanned aerial vehicle control apparatus and an unmanned aerial vehicle apparatus that belong to a same unmanned aerial vehicle communication system can implement pairing and connection, so that the unmanned aerial vehicle control apparatus controls the unmanned aerial vehicle apparatus. The unmanned aerial vehicle control apparatus (or referred to as an unmanned aerial vehicle controller) may be configured to control the unmanned aerial vehicle, for example, triggering an operation instruction, and controlling a flight status and a flight track of the unmanned aerial vehicle. The unmanned aerial vehicle may perform a corresponding flight operation based on the operation instruction triggered by the unmanned aerial vehicle control apparatus. The operation instruction herein may be sent by using the unmanned aerial vehicle communication system. In the embodiments, the unmanned aerial vehicle control apparatus and the unmanned aerial vehicle may be collectively referred to as the unmanned aerial vehicle apparatus.
5. A traffic management entity is a core network (CN) entity that is provided by a 3GPP and that is configured to manage an unmanned aerial vehicle control apparatus and an unmanned aerial vehicle. The traffic management entity may be configured to store related data of the unmanned aerial vehicle control apparatus and the unmanned aerial vehicle, for example, an identifier of the unmanned aerial vehicle apparatus, information about an owner of the unmanned aerial vehicle apparatus, path information, current address information of the unmanned aerial vehicle apparatus, and an operating status. The traffic management entity may further be configured to perform pairing between the unmanned aerial vehicle control apparatus and the unmanned aerial vehicle, identify a UAS, authorize another device to operate the UAS, manage or intervene in communication between the unmanned aerial vehicle control apparatus and the unmanned aerial vehicle, or the like. The traffic management entity includes, but is not limited to, an unmanned aerial vehicle traffic management (UTM). Currently, only one traffic management entity or a plurality of traffic management entities that exchange information may be set on a core network side.

The following describes the embodiments in detail with reference to the accompanying drawings. First, a wireless communication system provided in the embodiments is described. A communication method provided in the embodiments may be applied to the system. Then, the communication method provided in the embodiments is described. Finally, an apparatus provided in the embodiments is described. The apparatus may be configured to perform the communication method provided in the embodiments.

An application scenario of the wireless communication system provided in the embodiments includes, but is not limited to, a global system of mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunication system (UMTS), a worldwide interoperability for microwave access (WiMAX) communication system, a future 5$^{th}$ generation (5G) system, a new radio (NR) communication system, an NR vehicle to everything (V2X) system, a future mobile communication-based internet of vehicles system, or the like. It should be understood that a wireless communication system 100 provided in the embodiments is applicable to both a low-frequency scenario (sub 6G) and a high-frequency scenario (above 6G).

For example, the wireless communication system provided in the embodiments may be a 5G communication system, including the traffic management entity (for example, the UTM). As shown in FIG. 1, in a possible implementation, the wireless communication system 100 provided in the embodiments may include a terminal (UE) 101, an access network (AN) or a radio access network (RAN) (referred to as (R)AN in the following) 102, a user plane function (UPF) 103, a session management function (SMF) 104 and a UTM 105. It should be understood that the wireless communication system 100 may further include other core network elements such as an access and mobility management function (AMF), an authentication server function (AUSF), a network slice selection function (NSSF), a network exposure function (NEF), a network function repository function (NRF), a policy control function (PCF), a unified data management (UDM), and an application function (AF).

It should be understood that the UE 101 may be the unmanned aerial vehicle apparatus (the unmanned aerial vehicle control apparatus and/or the unmanned aerial vehicle) in the embodiments. The UE 101 may access the SMF 104 by using the (R)AN 102.

A main function of the (R)AN 102 is to control a user (for example, UE) to access a mobile communication network by using an access network. For example, a RAN implements a radio access technology, and provides connection between a communication device, for example, the UE, and a core network. A RAN device forming the RAN includes but is not limited to a base station (g nodeB, gNB) in 5G, an eNodeB, a radio network controller (RNC), a node B (NB), a base station controller (base station controller, BSC), a base transceiver station (BTS), a home evolved node B (for example, home evolved base station, or home node B, HNB), a baseband unit (BBU), a transmitting and receiving point (TRP), a transmitting point (TP), a mobile switching center, and the like. In addition, the RAN device may further include a wireless fidelity (wifi) access point (AP), and the like.

The UPF 103 may be used as a UPF corresponding to the UE 101, and is configured to process a packet sent by the UE 101 or sent to the UE 101, collect statistics about the packet, and forward the packet on a user plane path.

The SMF 104 may be configured to manage the UE 101, and may be configured to manage a session of the UE 101, select the UPF corresponding to the UE 101, create a user plane data transmission path of the session on the UPF, and configure a packet processing rule for the UPF to implement user plane data transmission.

The UTM 105 may be configured to manage the unmanned aerial vehicle control apparatus and the unmanned aerial vehicle. The UTM 105 may communicate with another core network element in the core network through a core network interface. For example, the UTM 105 communicates with the SMF 104 through the core network interface (for example, a Nutm interface).

Figure 2:
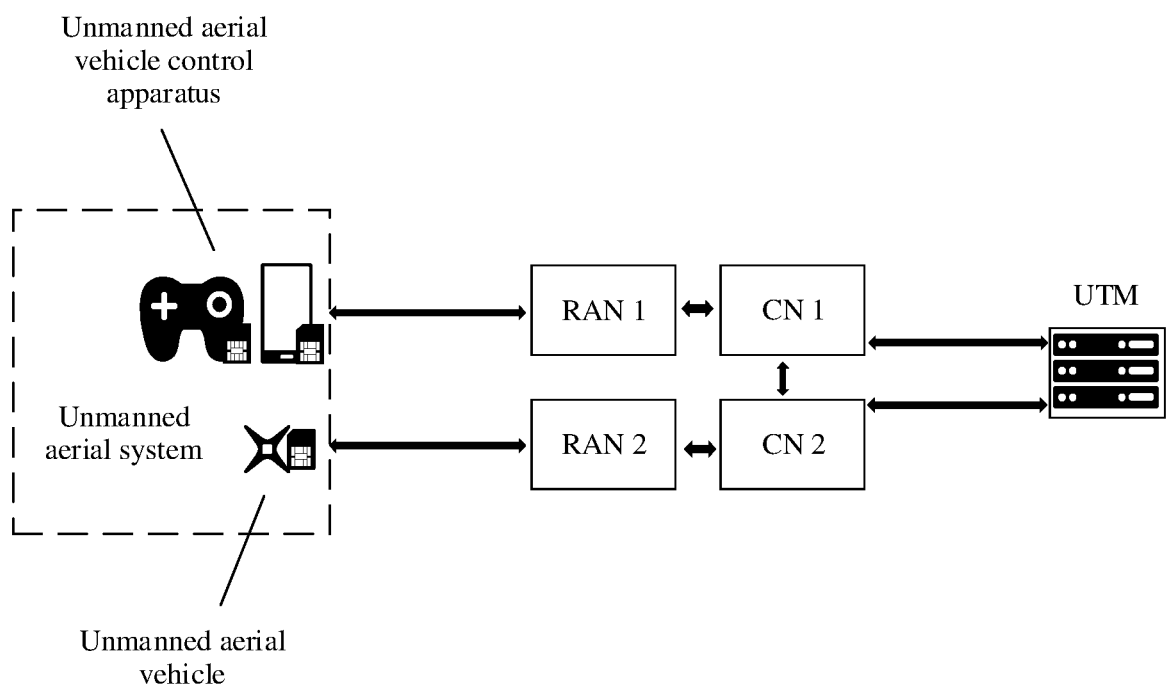
FIG. 2 is a schematic architectural diagram of a communication system according to the embodiments.

As shown in FIG. 2, based on the wireless communication system 100 shown in FIG. 1, when long-distance communication is performed, the unmanned aerial vehicle control apparatus and the unmanned aerial vehicle may separately access different RANs (the different RANs herein may be RANs in different geographical locations, so that an unmanned aerial vehicle control apparatus and an unmanned aerial vehicle that are located at different locations access the different RANs), and may separately access the core network by using different RANs. Then, the unmanned aerial vehicle controller and the unmanned aerial vehicle may separately be connected to a same UTM by using the core network. Therefore, address information of the unmanned aerial vehicle controller and the unmanned aerial vehicle in different radio access devices is exchanged by using the UTM, to implement pairing.

Figure 3:
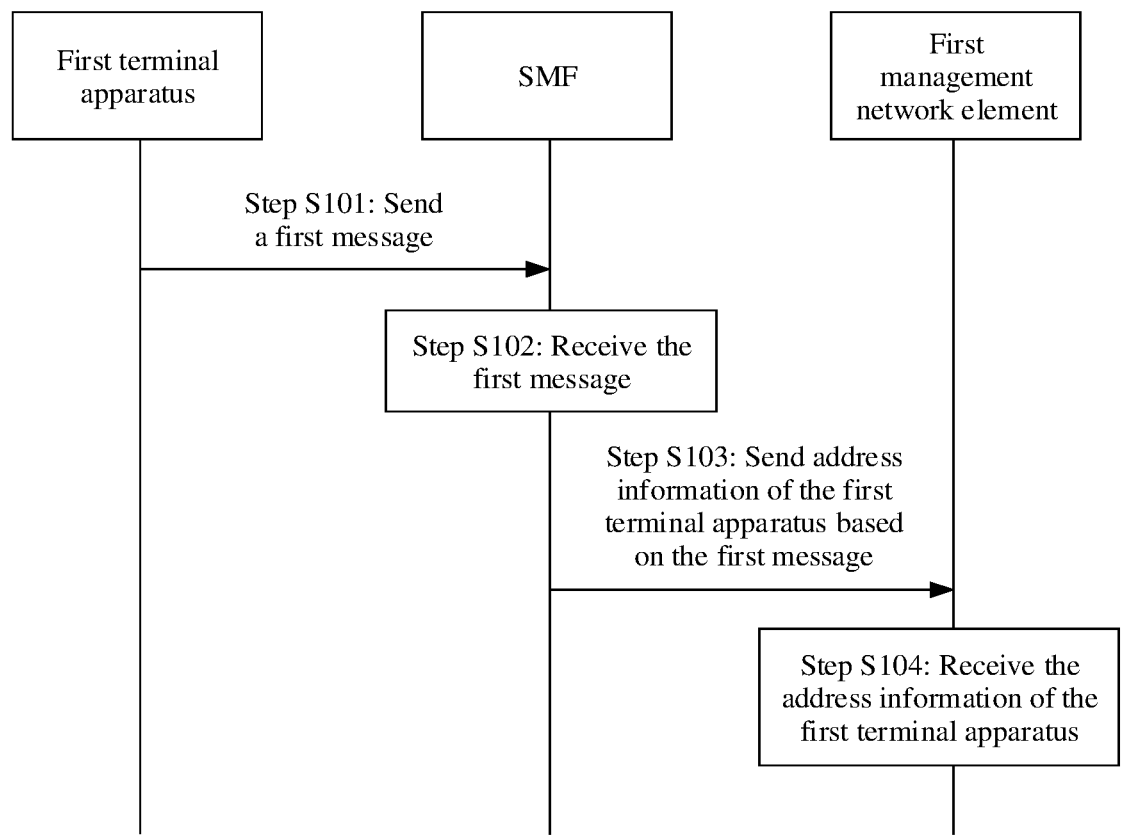
FIG. 3 is a schematic flowchart of a communication method according to the embodiments.

The following describes the communication method provided in the embodiments with reference to FIG. 3. The method is performed by a first terminal apparatus (an unmanned aerial vehicle apparatus in an unmanned aerial vehicle communication system, which may be the unmanned aerial vehicle apparatus or an unmanned aerial vehicle control apparatus), an SMF that manages the first terminal apparatus, and a traffic management entity. It should be understood that the first terminal apparatus herein may be the unmanned aerial vehicle control apparatus or may be an unmanned aerial vehicle.

The method may include the following steps.

S101: The first terminal apparatus sends a first message to a session management function SMF, where the first message is used to request the SMF to establish a first session for the first terminal apparatus, the first message is further used to indicate that the first session is used for communication between the first terminal apparatus and a second terminal apparatus, and the first terminal apparatus and the second terminal apparatus belong to a same unmanned aerial vehicle communication system.

S102: The SMF receives the first message.

S103: The SMF sends address information of the first terminal apparatus to a first management network element based on the first message, where the address information of the first terminal apparatus may be used to indicate an address of the first terminal apparatus and/or an address of a user plane function UPF corresponding to the first terminal apparatus.

S104: The first management network element receives the address information of the first terminal apparatus.

In the foregoing communication method, after the SMF receives the first message that is sent by the first terminal apparatus and that is used to request to establish the first session, if the first message is used to indicate that the first session is used to indicate the first terminal apparatus and the second terminal apparatus in the same unmanned aerial vehicle communication system to communicate with each other, the SMF sends the address information of the first terminal apparatus to the first management network element. This provides a possibility of exchanging address information of terminal apparatuses in the unmanned aerial vehicle communication system.

In an implementation of the step shown in S101, the first session herein may be a protocol data unit (PDU) session. The PDU session may be used to transmit uplink and downlink user data of the first terminal apparatus. Therefore, the communication method provided in the embodiments may be initiated when the unmanned aerial vehicle terminal apparatus requests the SMF to establish the PDU session. The first message may be a PDU session establishment request message sent by the first terminal apparatus to the SMF, and the message is used to request to establish the PDU session (namely, the first session). After receiving the first message used to request to establish the first session, the SMF may select a UPF for the first terminal apparatus in a process of establishing the first session, and the UPF is the UPF corresponding to the first terminal apparatus. In an implementation, because the first message further indicates that the first session is used for communication between unmanned aerial vehicle apparatuses in the unmanned aerial vehicle communication system, the SMF may select a UPF that supports the communication between the unmanned aerial vehicle apparatuses as the UPF corresponding to the first terminal apparatus. The UPF that supports the communication between the unmanned aerial vehicle apparatuses can meet a specific quality of service (QoS) requirement of the unmanned aerial vehicle. In a possible implementation, the first message may carry information used to indicate that the first session is used for the communication between the first terminal apparatus and the second terminal apparatus in the unmanned aerial vehicle communication system. For example, a bit in a field in the first message may be used to indicate that the first session is used for the communication between the first terminal apparatus and the second terminal apparatus in the unmanned aerial vehicle communication system.

After selecting the UPF corresponding to the first terminal apparatus, the SMF may further send an N4 session establishment request to the UPF, to request to establish an N4 session between the SMF and the UPF. The N4 session establishment request may carry the information used to indicate that the first session is used for the communication between the first terminal apparatus and the second terminal apparatus in the unmanned aerial vehicle communication system. After sending the N4 session establishment request to the UPF, the SMF may further receive a response message sent by the UPF. The response message may be used to indicate that establishment of the N4 session between the SMF and the UPF is completed.

In an implementation of the step shown in S103, the SMF may further send an identifier of the first terminal apparatus to the first management network element. In an implementation, because the SMF manages the first terminal apparatus, the SMF may obtain the identifier of the first terminal apparatus in a process in which the first terminal apparatus accesses the SMF. Before sending the address information of the first terminal apparatus, the SMF may further query the address of the first terminal apparatus from a unified data management (UDM) after receiving the first message and use the address of the first terminal apparatus as the address information of the first terminal apparatus. Alternatively, when selecting the UPF for the first terminal apparatus, the SMF may allocate an address to the first terminal apparatus and use the address as the address information of the first terminal apparatus. In addition, the SMF may also use address information of the UPF selected for the first terminal apparatus (namely, information used to indicate the address of the UPF corresponding to the first terminal apparatus) as the address information of the first terminal apparatus.

The first management network element in the embodiments may be a traffic management entity (for example, a UTM) or a PCF. That the traffic management entity is the UTM is used as an example for further description.

In a possible implementation, the SMF may send the address information of the first terminal apparatus to the UTM. After receiving the address information of the first terminal apparatus according to the step shown in S104, the UTM may store the address information of the first terminal apparatus. Then, the UTM may send a first response message to the SMF, to indicate that the address information of the first terminal apparatus is stored. In addition, if the SMF may further send the identifier of the first terminal apparatus to the UTM, the UTM may store a correspondence between the identifier of the first terminal apparatus and the address information of the first terminal apparatus.

After sending the address information of the first terminal apparatus to the UTM, the SMF may further receive address information of the second terminal apparatus sent by the UTM. The address information of the second terminal apparatus is used to indicate an address of the second terminal apparatus and/or an address of a UPF corresponding to the second terminal apparatus.

In an implementation, the SMF may determine a first rule based on the address information of the second terminal apparatus. The first rule may be used for the communication between the first terminal apparatus and the second terminal apparatus. The first rule can include a routing rule from the first terminal apparatus to the second terminal apparatus, and/or include a data packet filtering rule between the first terminal apparatus and the second terminal apparatus. The routing rule may be used for routing of an instruction and/or data transmitted between the first terminal apparatus and the second terminal apparatus. The data packet filtering rule may be used to identify a data packet flow transmitted between the first terminal apparatus and the second terminal apparatus. The SMF may send the first rule to the UPF corresponding to the first terminal apparatus, so that the UPF supports the communication between the first terminal apparatus and the second terminal apparatus. For example, the UPF may locally store the first rule. Subsequently, when information such as an instruction or data sent by the first terminal apparatus to the second terminal apparatus passes through the UPF, the UPF may perform routing and/or data packet flow identification according to the first rule.

In addition, in an implementation, the SMF may allocate, based on the address information of the second terminal apparatus, a tunnel corresponding to the first session, and send information about the tunnel to the UPF corresponding to the first terminal apparatus. The tunnel is a dedicated channel for communication between the UPF corresponding to the first terminal apparatus and the UPF corresponding to the second terminal apparatus. The tunnel one-to-one corresponds to the first session. When data that needs to be transmitted to the second terminal apparatus arrives at the UPF corresponding to the first terminal apparatus, the UPF corresponding to the first terminal apparatus may directly send the data to the UPF corresponding to the second terminal apparatus through the tunnel.

In addition, the SMF may also send the address information of the second terminal apparatus to the UPF corresponding to the first terminal apparatus, so that the UPF determines the first rule, or the UPF allocates the tunnel corresponding to the first session.

For example, before receiving the address information of the second terminal apparatus sent by the UTM, the SMF may further send a second message to the UTM. The second message may be used to subscribe to the address information of the second terminal apparatus. The second message may carry an identifier of the second terminal apparatus. For example, the second message may be used to request the UTM to send the address information of the second terminal apparatus to the SMF after storing the address information of the second terminal apparatus. For example, if the UTM does not store the address information of the second terminal apparatus when receiving the second message, the UTM may send the address information of the second terminal apparatus to the SMF after storing the address information of the second terminal apparatus. In addition, the UTM may also select, according to preconfiguration (for example, the UTM may learn of, in advance, an unmanned aerial vehicle terminal apparatus that can perform pairing and connection to the first terminal apparatus), at least one terminal apparatus from terminal apparatuses to which the stored address information belongs as the second terminal apparatus. Therefore, even if the second message does not carry the identifier of the second terminal apparatus, the UTM can also send the address information of the second terminal apparatus to the SMF, thereby improving pairing efficiency of the unmanned aerial vehicle terminal apparatus.

Alternatively, when sending the address information of the first terminal apparatus to the UTM, the SMF may further send, to the UTM, indication information used to request the address information of the second terminal apparatus, so that after storing the address information of the first terminal apparatus, the UTM sends the address information of the second terminal apparatus to the SMF.

In addition, the SMF may further request the UTM to send the stored address information of the second terminal apparatus to the SMF, and the UTM may query the address information of the second terminal apparatus. The request may carry the identifier of the second terminal apparatus. For example, if the UTM stores a correspondence between the identifier of the second terminal apparatus and the address information of the second terminal apparatus, the UTM may determine the address information of the second terminal apparatus based on the identifier of the second terminal apparatus. If the UTM does not find the address information of the second terminal apparatus, the UTM may feed back to the SMF, to indicate that the UTM does not find the address information of the second terminal apparatus. Alternatively, the UTM may not feed back, and the SMF determines, after sending the second message, that the address information of the second terminal apparatus is not received within preset duration, to determine that the UTM does not find the address information of the second terminal apparatus. After determining that the UTM does not find the address information of the second terminal apparatus, the SMF may send the second message to the UTM, to subscribe to the address information of the second terminal apparatus. The UTM may send the address information of the second terminal apparatus to the SMF based on the second message after storing the address information of the second terminal apparatus.

For example, the SMF may further send an identifier of the PCF and/or address information of the PCF to the UTM, and the SMF may further send, to the UTM, information used to request the PCF to determine a session management (SM) policy of the first session. The information may be sent by the SMF to the UTM by using a separate message or may be sent to the UTM as information in another message. The information may be used to indicate the UTM to trigger the PCF to determine the session management policy of the first session. In a solution in which the information used to request the PCF to determine the session management policy of the first session is sent, the SMF may further send the identifier of the first terminal apparatus and/or the identifier of the second terminal apparatus to the UTM. Then, after determining the address information of the second terminal apparatus, the UTM sends the address information of the second terminal apparatus to the PCF based on the information used to request the PCF to determine the session management policy of the first session, so that the PCF determines the session management policy of the first session. The session management policy of the first session may be used to determine a second rule. The second rule includes a routing rule from the first terminal apparatus to the second terminal apparatus and/or a data packet filtering rule between the first terminal apparatus and the second terminal apparatus. After determining the session management policy of the first session, the PCF may send the session management policy of the first session to the SMF. The SMF determines the second rule according to the session management policy of the first session and sends the second rule to the UPF corresponding to the first terminal apparatus. The UPF performs, according to the second rule, routing of the instruction and/or the data and/or filtering of data packet between the first terminal apparatus and the second terminal apparatus.

Further, the UTM may further send the address information of the second terminal apparatus to the PCF, so that the PCF determines the session management policy of the first session. Before the UTM sends the address information of the second terminal apparatus to the PCF, the SMF may further send the second message to the UTM, to subscribe to the address information of the second terminal apparatus. If the UTM does not find the address information of the second terminal apparatus, the UTM may not send the address information of the second terminal apparatus to the PCF. When the PCF receives the message used to request the PCF to determine the session management policy of the first session but does not receive the address information of the second terminal apparatus, the PCF may send a third message to the UTM. The third message is used to subscribe to the address information of the second terminal apparatus. For a setting and sending manner of the third message, refer to a sending manner of the second message.

For example, after the UTM stores the address information of the first terminal apparatus, if the UTM previously receives a message that is sent by an SMF that manages the second terminal apparatus and/or the UPF corresponding to the second terminal apparatus and that is used to subscribe to the address information of the first terminal apparatus, the UTM may send the address information of the first terminal apparatus to the SMF that manages the second terminal apparatus and/or the UPF corresponding to the second terminal apparatus. For a manner of the message that is sent by the SMF that manages the second terminal apparatus and/or the UPF corresponding to the second terminal apparatus and that is used to subscribe to the address information of the first terminal apparatus, refer to the sending manner of the second message in the embodiments. For a processing manner after the SMF that manages the second terminal apparatus receives the address information of the first terminal apparatus, refer to a processing manner after the SMF that manages the first terminal apparatus receives the address information of the second terminal apparatus provided in the embodiments. For a processing manner after the UPF corresponding to the second terminal apparatus receives the address information of the first terminal apparatus, refer to a processing manner after the UPF corresponding to the first terminal apparatus receives the address information of the second terminal apparatus provided in the embodiments.

In another possible implementation, the SMF may send the address information of the first terminal apparatus to the PCF. Then, the PCF may send the address information of the first terminal apparatus to the UTM, and then the UTM may store the address information of the first terminal apparatus. In the foregoing manner, the SMF may send the address information of the first terminal apparatus to the UTM, and the UTM stores the address information of the first terminal apparatus, so that the UTM manages address information of the unmanned aerial vehicle apparatus in the unmanned aerial vehicle communication system. After the UTM stores the address information of the first terminal apparatus, the UTM may send a second response message to the PCF. The second response message is used to indicate the UTM to complete storage of the address information of the first terminal apparatus. In an implementation, the SMF may further send the identifier of the second terminal apparatus to the PCF.

For example, the SMF may send the message, carrying the address information of the first terminal apparatus, used to request the PCF to determine the session management policy of the first session to the PCF. Alternatively, the SMF may separately send the message and the address information of the first terminal apparatus to the PCF. The message used to request the PCF to determine the session management policy of the first session may further carry information used to indicate that the first session is used for the communication between the first terminal apparatus and the second terminal apparatus in the same unmanned aerial vehicle communication system.

After receiving the message used to request the PCF to determine the session management policy of the first session, the PCF may further send a fourth message to the UTM. The fourth message may be used to request to subscribe to the address information of the second terminal apparatus, and then the PCF may receive the address information of the second terminal apparatus from the UTM. For a setting and sending manner of the fourth message, refer to a sending manner of the second message. After receiving the address information of the second terminal apparatus from the UTM, the PCF may determine the session management policy of the first session based on the address information and send the session management policy of the first session to the SMF. The SMF may determine the second rule according to the session management policy of the first session and send the second rule to the UPF corresponding to the first terminal apparatus. The second rule is used for the communication between the first terminal apparatus and the second terminal apparatus. For example, the second rule may include the routing rule from the first terminal apparatus to the second terminal apparatus and/or the data packet filtering rule between the first terminal apparatus and the second terminal apparatus.

Figure 4A:
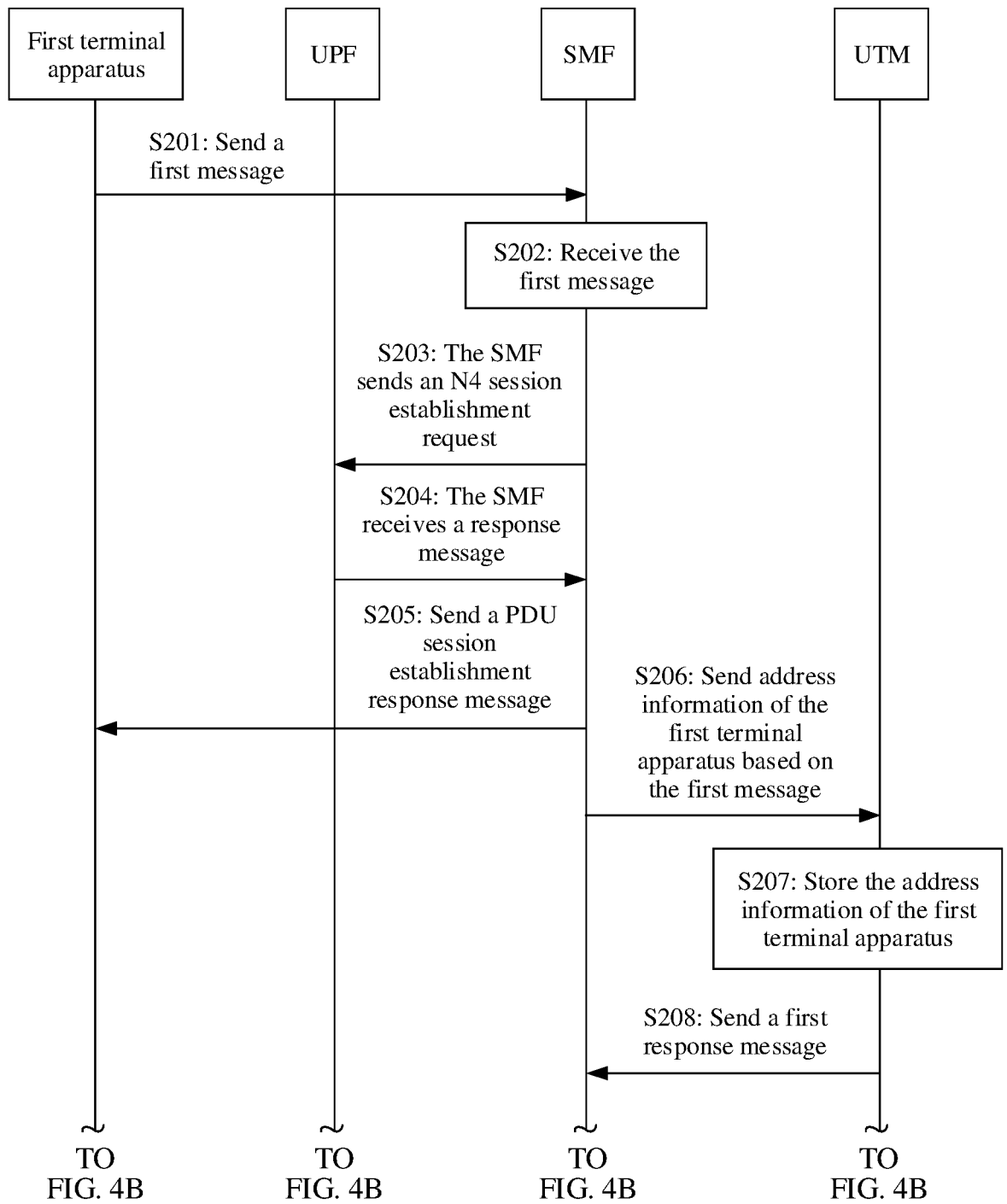
FIG. 4A and FIG. 4B are a schematic flowchart of a communication method according to the embodiments.
Figure 4B:
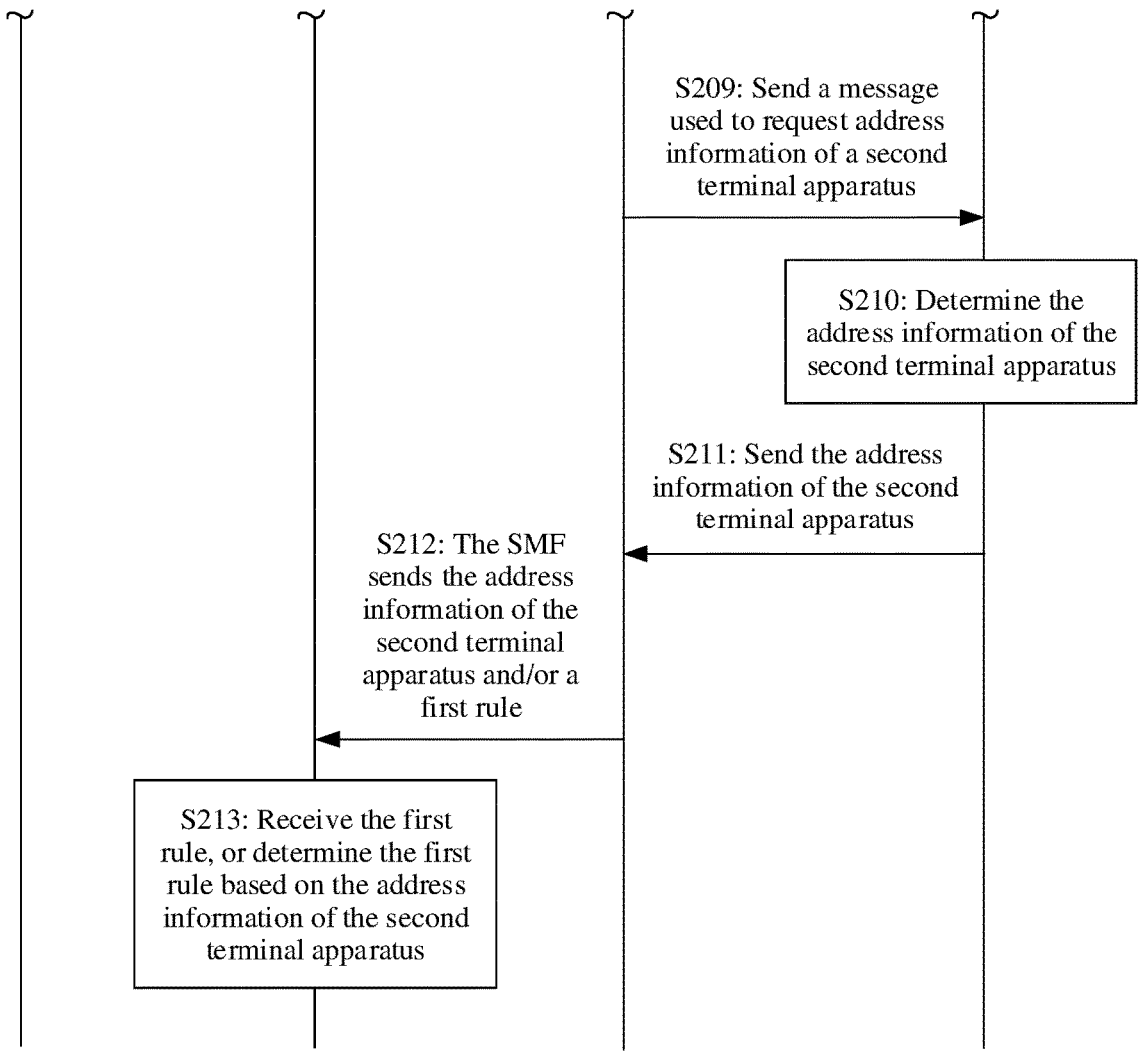

The following describes, with reference to FIG. 4A and FIG. 4B, a procedure of a communication method according to an embodiment is described. The procedure includes the following steps.

S201: A first terminal apparatus sends a first message to an SMF, where the first message is used to request the SMF to establish a first session for the first terminal apparatus, the first message is further used to indicate that the first session is used for communication between the first terminal apparatus and a second terminal apparatus, and the first terminal apparatus and the second terminal apparatus belong to a same unmanned aerial vehicle communication system. The first message may carry information used to indicate that the first session is used for the communication between the first terminal apparatus and the second terminal apparatus in the same unmanned aerial vehicle communication system. The first message may further carry an identifier of the second terminal apparatus. The first message may be a PDU session establishment request.

S202: The SMF receives the first message.

S203: The SMF sends, based on the first message, an N4 session establishment request to a UPF corresponding to the first terminal apparatus. The N4 session establishment request may carry the information used to indicate that the first session is used for the communication between the first terminal apparatus and the second terminal apparatus in the same unmanned aerial vehicle communication system.

S204: The SMF receives a response message from the UPF corresponding to the first terminal apparatus, where the response message indicates that establishment of an N4 session between the SMF and the UPF is completed.

S205: The SMF sends a PDU session establishment response message to the first terminal apparatus, to indicate that establishment of the first session is completed. It should be understood that the PDU session establishment response message herein may further be used to indicate that the first session fails to be established when the first session fails to be established.

S206: The SMF sends address information of the first terminal apparatus to a UTM based on the first message, so that the UTM stores the address information of the first terminal apparatus.

S207: The UTM receives and stores the address information of the first terminal apparatus. If the UTM previously receives a message that is sent by an SMF that manages the second terminal apparatus and/or a UPF corresponding to the second terminal apparatus and that is used to subscribe to the address information of the first terminal apparatus, after S207, the UTM may send the address information of the first terminal apparatus to the SMF that manages the second terminal apparatus and/or the UPF corresponding to the second terminal apparatus.

S208: The UTM sends a first response message to the SMF, where the first response message is used to indicate that the UTM has stored the address information of the first terminal apparatus.

S209: The SMF sends a message used to request address information of the second terminal apparatus to the UTM. The message may include an identifier of the second terminal apparatus.

S210: The UTM receives the message used to request the address information of the second terminal apparatus and determines the address information of the second terminal apparatus. The UTM may query and determine the address information of the second terminal apparatus from the stored identifier of the terminal apparatus and the stored address information of the terminal apparatus based on the identifier of the second terminal apparatus carried in the message. Alternatively, the UTM may select, according to preconfiguration, at least one terminal apparatus that can perform pairing and connection to the first terminal apparatus from terminal apparatuses to which the stored address information belongs as the second terminal apparatus and use address information of the terminal apparatus as the address information of the second terminal apparatus. If the UTM does not find the address information of the second terminal apparatus, the UTM may perform corresponding feedback to the SMF, or does not perform feedback, so that the SMF determines, after determining that the address information of the second terminal apparatus is not received within preset duration, that the UTM does not find the address information of the second terminal apparatus. In this case, the SMF may send a second message to the UTM, to subscribe to the address information of the second terminal apparatus. After receiving the second message, the UTM may send the address information of the second terminal apparatus to the SMF after storing the address information of the second terminal apparatus.

S211: The UTM sends the address information of the second terminal apparatus to the SMF.

S212: The SMF sends the address information of the second terminal apparatus and/or a first rule to the UPF corresponding to the first terminal apparatus. The first rule is determined by the SMF based on the address information of the second terminal apparatus. The first rule may include a routing rule from the first terminal apparatus to the second terminal apparatus, and/or include a data packet filtering rule between the first terminal apparatus and the second terminal apparatus.

S213: The UPF receives the first rule, or the UPF determines the first rule based on the address information of the second terminal apparatus.

It should be understood that the steps S207 to S213 may also be completed before S206. A time sequence relationship between the foregoing steps is not limited in the embodiments.

Figure 5A:
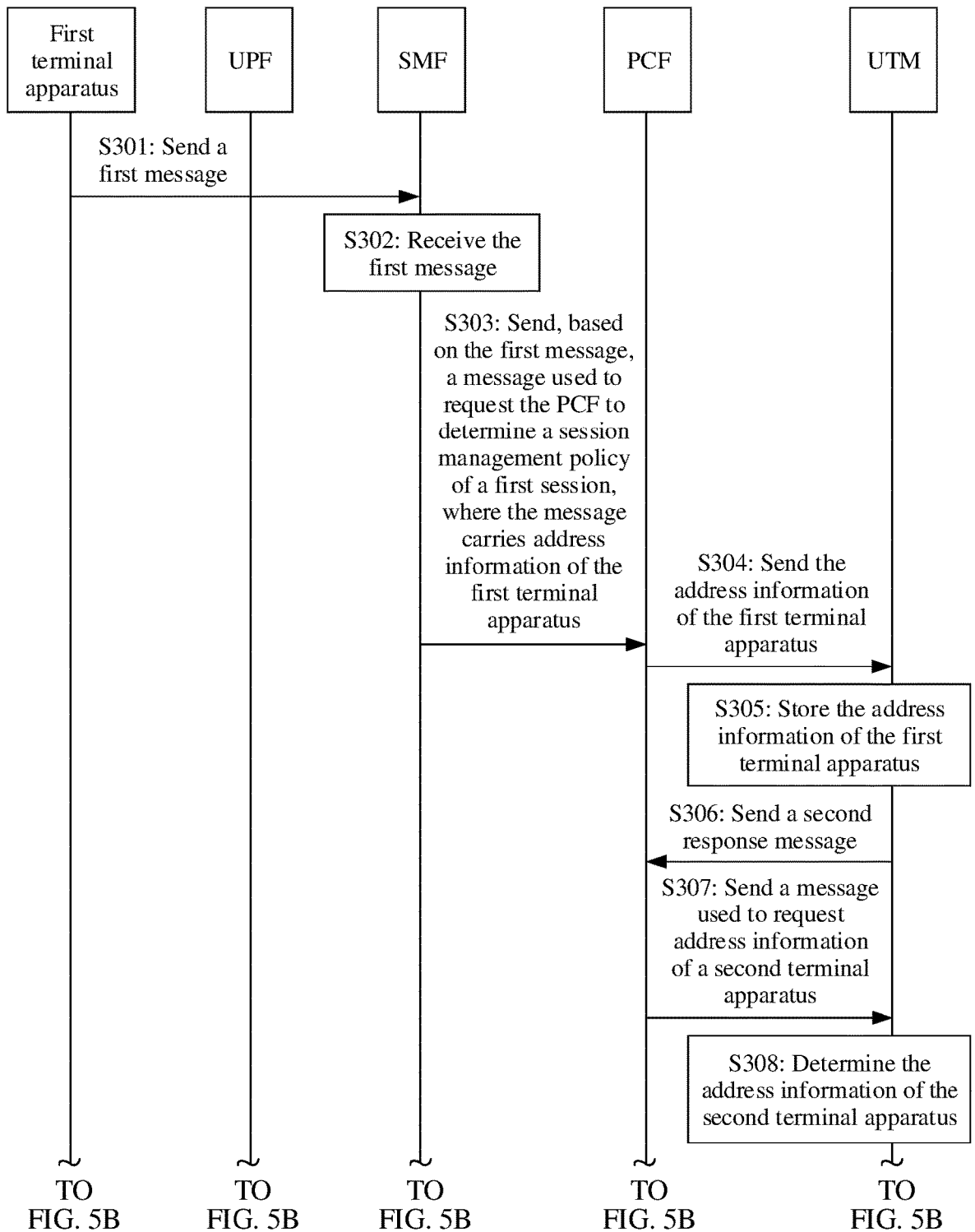
FIG. 5A and FIG. 5B are a schematic flowchart of a communication method according to the embodiments.
Figure 5B:
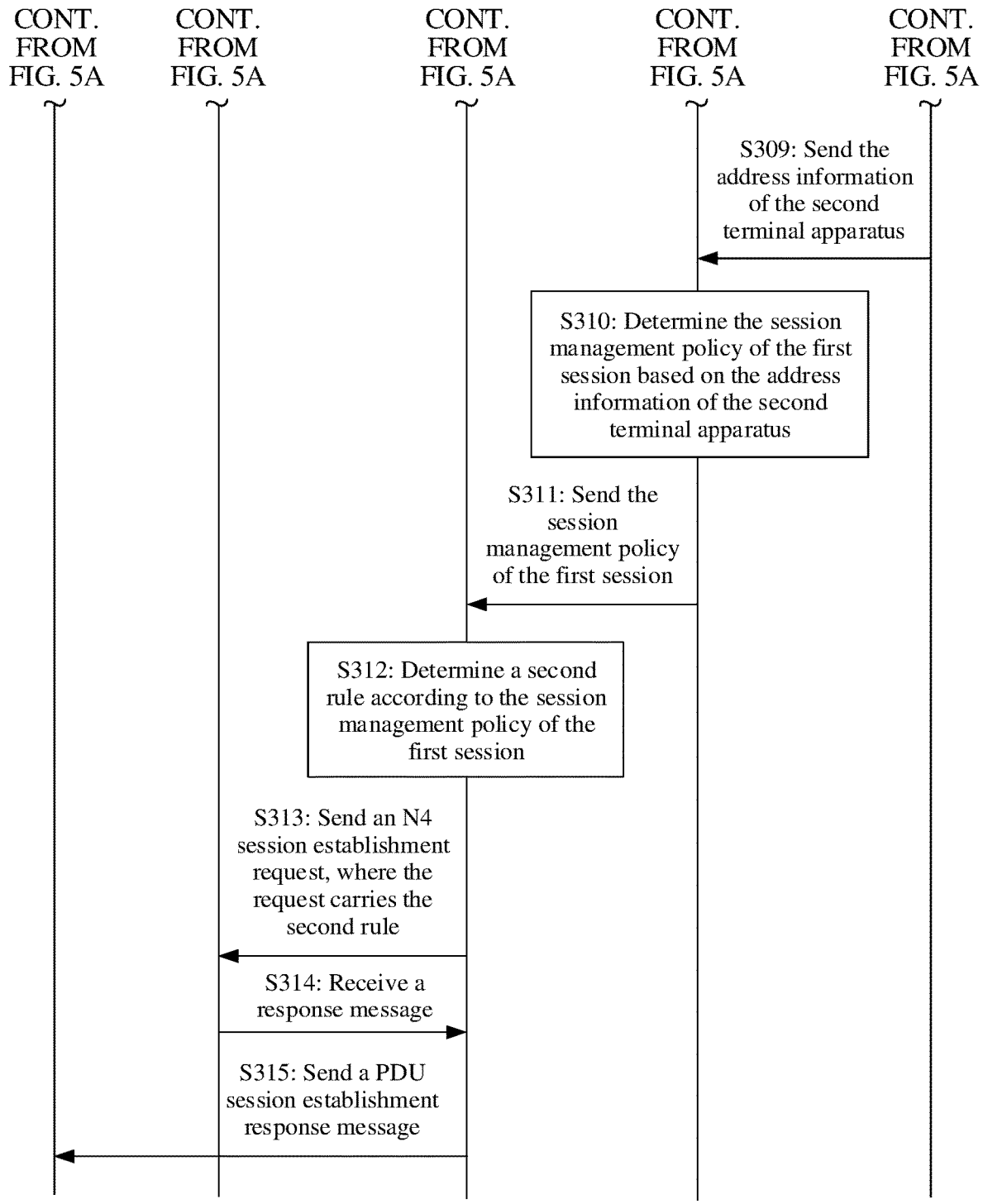

The following describes, with reference to FIG. 5A and FIG. 5B, a procedure of another communication method according to an embodiment is described. The procedure includes the following steps.

S301: A first terminal apparatus sends a first message to an SMF, where the first message is used to request the SMF to establish a first session for the first terminal apparatus, the first message is further used to indicate that the first session is used for communication between the first terminal apparatus and a second terminal apparatus, and the first terminal apparatus and the second terminal apparatus belong to a same unmanned aerial vehicle communication system. The first message may carry information used to indicate that the first session is used for the communication between the first terminal apparatus and the second terminal apparatus in the same unmanned aerial vehicle communication system. The first message may further carry an identifier of the second terminal apparatus.

S302: The SMF receives the first message.

S303: The SMF sends, based on the first message, a message used to request a PCF to determine a session management policy of the first session to the PCF, where the message carries address information of the first terminal apparatus. The first message may further carry the information used to indicate that the first session is used for the communication between the first terminal apparatus and the second terminal apparatus in the same unmanned aerial vehicle communication system.

S304: The PCF sends the address information of the first terminal apparatus to a UTM.

S305: The UTM receives and stores the address information of the first terminal apparatus. If the UTM previously receives a message that is sent by an SMF that manages the second terminal apparatus and/or a UPF corresponding to the second terminal apparatus and that is used to subscribe to the address information of the first terminal apparatus, after S307, the UTM may send the address information of the first terminal apparatus to the SMF that manages the second terminal apparatus and/or the UPF corresponding to the second terminal apparatus.

S306: The UTM sends a second response message to the PCF, where the second response message is used to indicate that the UTM has stored the address information of the first terminal apparatus.

S307: The PCF sends a message used to request address information of the second terminal apparatus to the UTM. The message may include the identifier of the second terminal apparatus.

S308: The UTM receives the message used to request the address information of the second terminal apparatus and determines the address information of the second terminal apparatus. The UTM may query and determine the address information of the second terminal apparatus from the stored identifier of the terminal apparatus and the stored address information of the terminal apparatus based on the identifier of the second terminal apparatus carried in the message. Alternatively, the UTM may select, according to preconfiguration, at least one terminal apparatus that can perform pairing and connection to the first terminal apparatus from terminal apparatuses to which the stored address information belongs as the second terminal apparatus and use address information of the terminal apparatus as the address information of the second terminal apparatus. If the UTM does not find the address information of the second terminal apparatus, the UTM may perform corresponding feedback to the PCF, or do not perform feedback, so that after determining that the address information of the second terminal apparatus is not received within preset duration, the PCF determines that the UTM does not find the address information of the second terminal apparatus. In this case, the PCF may send a fifth message to the UTM to subscribe to address information of the second terminal apparatus. After receiving the fifth message, the UTM may send the address information of the second terminal apparatus to the PCF after storing the address information of the second terminal apparatus.

S309: The UTM sends the address information of the second terminal apparatus to the PCF.

S310: The PCF receives the address information of the second terminal apparatus and determines the session management policy of the first session based on the address information of the second terminal apparatus.

S311: The PCF sends the session management policy of the first session to the SMF.

S312: The SMF determines a second rule according to the session management policy of the first session, where the second rule may include a routing rule from the first terminal apparatus to the second terminal apparatus and/or a data packet filtering rule between the first terminal apparatus and the second terminal apparatus.

S313: The SMF sends an N4 session establishment request to the UPF corresponding to the first terminal apparatus, where the request carries the second rule. The N4 session establishment request may further carry the information used to indicate that the first session is used for the communication between the first terminal apparatus and the second terminal apparatus in the same unmanned aerial vehicle communication system.

S314: The SMF receives a response message from the UPF corresponding to the first terminal apparatus, where the response message indicates that establishment of an N4 session between the SMF and the UPF is completed.

S315: The SMF sends a PDU session establishment response message to the first terminal apparatus, to indicate that establishment of the first session is completed.

It should be understood that the steps S406 to S415 may also be completed before S405. A time sequence relationship between the foregoing steps is not limited in the embodiments.

Figure 6A:
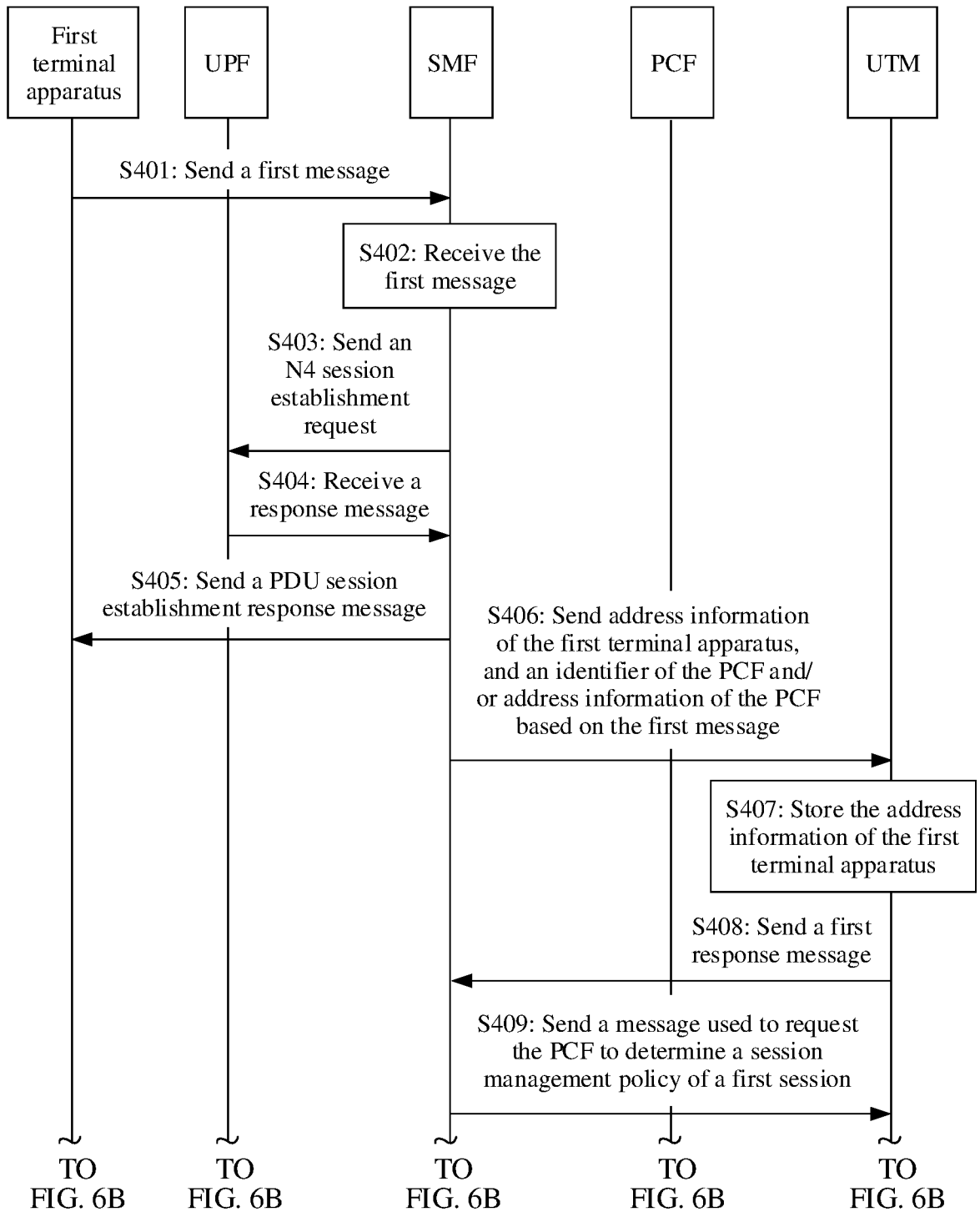
FIG. 6A and FIG. 6B are a schematic flowchart of a communication method according to the embodiments.
Figure 6B:
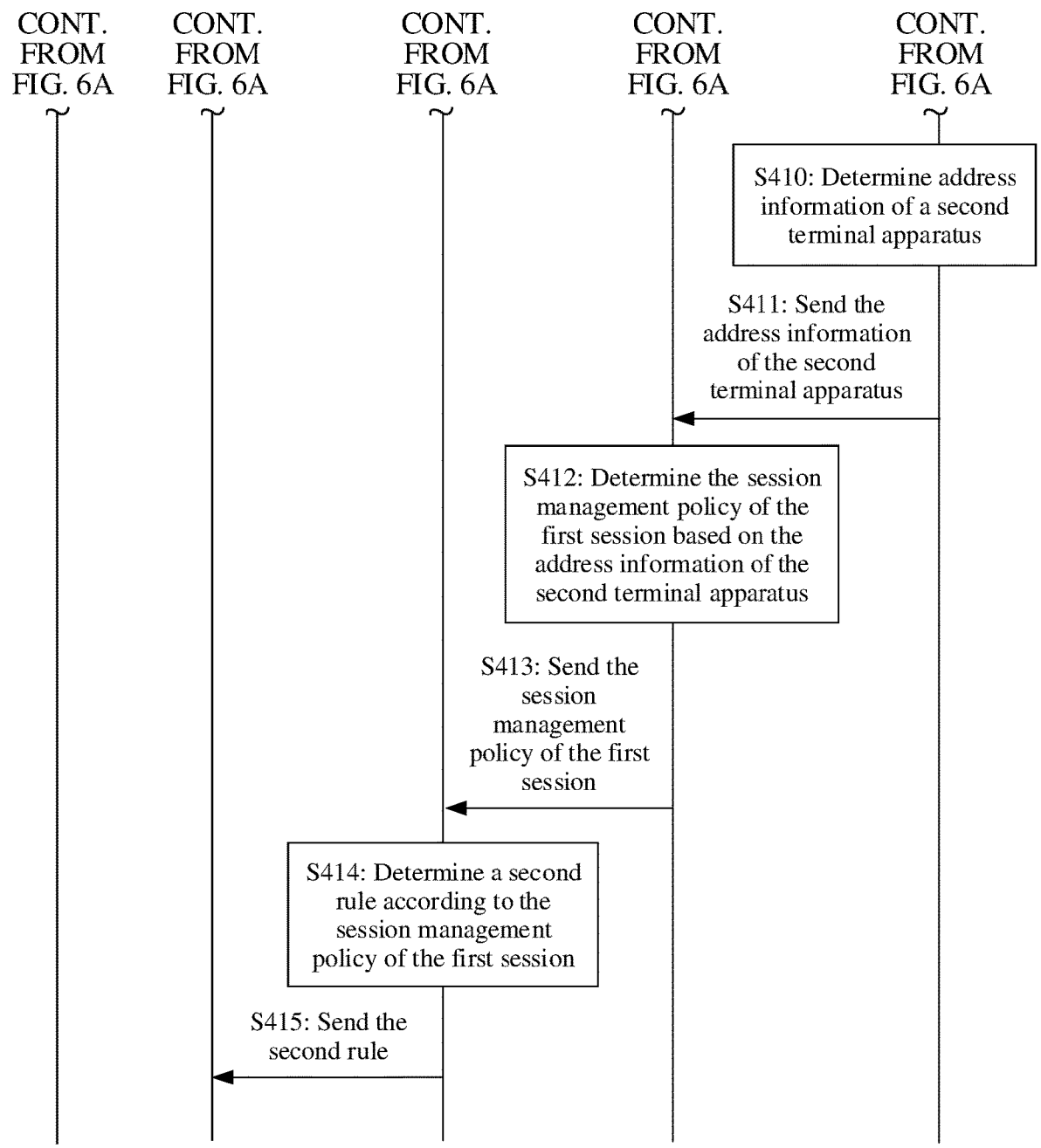

The following describes, with reference to FIG. 6A and FIG. 6B, a procedure of another communication method according to an embodiment is described. The procedure includes the following steps.

S401: A first terminal apparatus sends a first message to an SMF, where the first message is used to request the SMF to establish a first session for the first terminal apparatus, the first message is further used to indicate that the first session is used for communication between the first terminal apparatus and a second terminal apparatus, and the first terminal apparatus and the second terminal apparatus belong to a same unmanned aerial vehicle communication system. The first message may carry information used to indicate that the first session is used for the communication between the first terminal apparatus and the second terminal apparatus in the same unmanned aerial vehicle communication system. The first message carries an identifier of the second terminal apparatus.

S402: The SMF receives the first message.

S403: The SMF sends, based on the first message, an N4 session establishment request to a UPF corresponding to the first terminal apparatus. The N4 session establishment request may carry the information used to indicate that the first session is used for the communication between the first terminal apparatus and the second terminal apparatus in the same unmanned aerial vehicle communication system.

S404: The SMF receives a response message from the UPF corresponding to the first terminal apparatus, where the response message indicates that establishment of an N4 session between the SMF and the UPF is completed.

S405: The SMF sends a PDU session establishment response message to the first terminal apparatus, to indicate that establishment of the first session is completed.

S406: The SMF sends address information of the first terminal apparatus, and an identifier of a PCF and/or address information of the PCF to a UTM based on the first message.

S407: The UTM receives and stores the address information of the first terminal apparatus. If the UTM previously receives a message that is sent by an SMF that manages the second terminal apparatus and/or a UPF corresponding to the second terminal apparatus and that is used to subscribe to the address information of the first terminal apparatus, after S407, the UTM may send the address information of the first terminal apparatus to the SMF that manages the second terminal apparatus and/or the UPF corresponding to the second terminal apparatus.

S408: The UTM sends a first response message to the SMF, where the first response message is used to indicate that the UTM has stored the address information of the first terminal apparatus.

S409: The SMF sends a message used to request the PCF to determine a session management policy of the first session to the UTM. The message is used to request the UTM to trigger the PCF to determine the session management policy of the first session. The second message may carry an identifier of the first terminal apparatus and the identifier of the second terminal apparatus.

S410: The UTM receives the message used to request the PCF to determine the session management policy of the first session and determines address information of the second terminal apparatus. The UTM may query and determine the address information of the second terminal apparatus from the stored identifier of the terminal apparatus and the stored address information of the terminal apparatus based on the identifier of the second terminal apparatus carried in the message. Alternatively, the UTM may select, according to preconfiguration, at least one terminal apparatus that can perform pairing and connection to the first terminal apparatus from terminal apparatuses to which the stored address information belongs as the second terminal apparatus and use address information of the terminal apparatus as the address information of the second terminal apparatus.

S411: The UTM sends, based on the identifier of the PCF and/or the address information of the PCF, the address information of the second terminal apparatus and the information used to request the PCF to determine the session management policy of the first session to the PCF. The information used to request the PCF to determine the session management policy of the first session is used to request the PCF to determine the session management policy of the first session. If the UTM finds the address information of the second terminal apparatus from the stored address information of the terminal apparatus after receiving the message used to request the PCF to determine the session management policy of the first session, the UTM may send both the address information of the second terminal apparatus and the information used to request the PCF to determine the session management policy of the first session to the PCF. If the UTM does not find the address information of the second terminal apparatus from the stored address information of the terminal apparatus, the UTM may send only the information used to request the PCF to determine the session management policy of the first session to the PCF. After determining that the second terminal apparatus receives the information used to request the PCF to determine the session management policy of the first session but does not receive the address information of the second terminal apparatus, the second terminal apparatus may send a fourth message to the UTM, to subscribe to the address information of the second terminal apparatus. After receiving the fourth message, the UTM may send the address information of the second terminal apparatus to the PCF after storing the address information of the second terminal apparatus.

S412: The PCF determines the session management policy of the first session based on the address information of the second terminal apparatus.

S413: The PCF sends the session management policy of the first session to the SMF.

S414: The SMF determines a second rule according to the session management policy of the first session. The second rule may include a routing rule from the first terminal apparatus to the second terminal apparatus and/or a data packet filtering rule between the first terminal apparatus and the second terminal apparatus.

S415: The SMF may send the second rule to the UPF corresponding to the first terminal apparatus.

It should be understood that the steps S406 to S415 may also be completed before S405. A time sequence relationship between the foregoing steps is not limited in the embodiments.

Figure 7A:
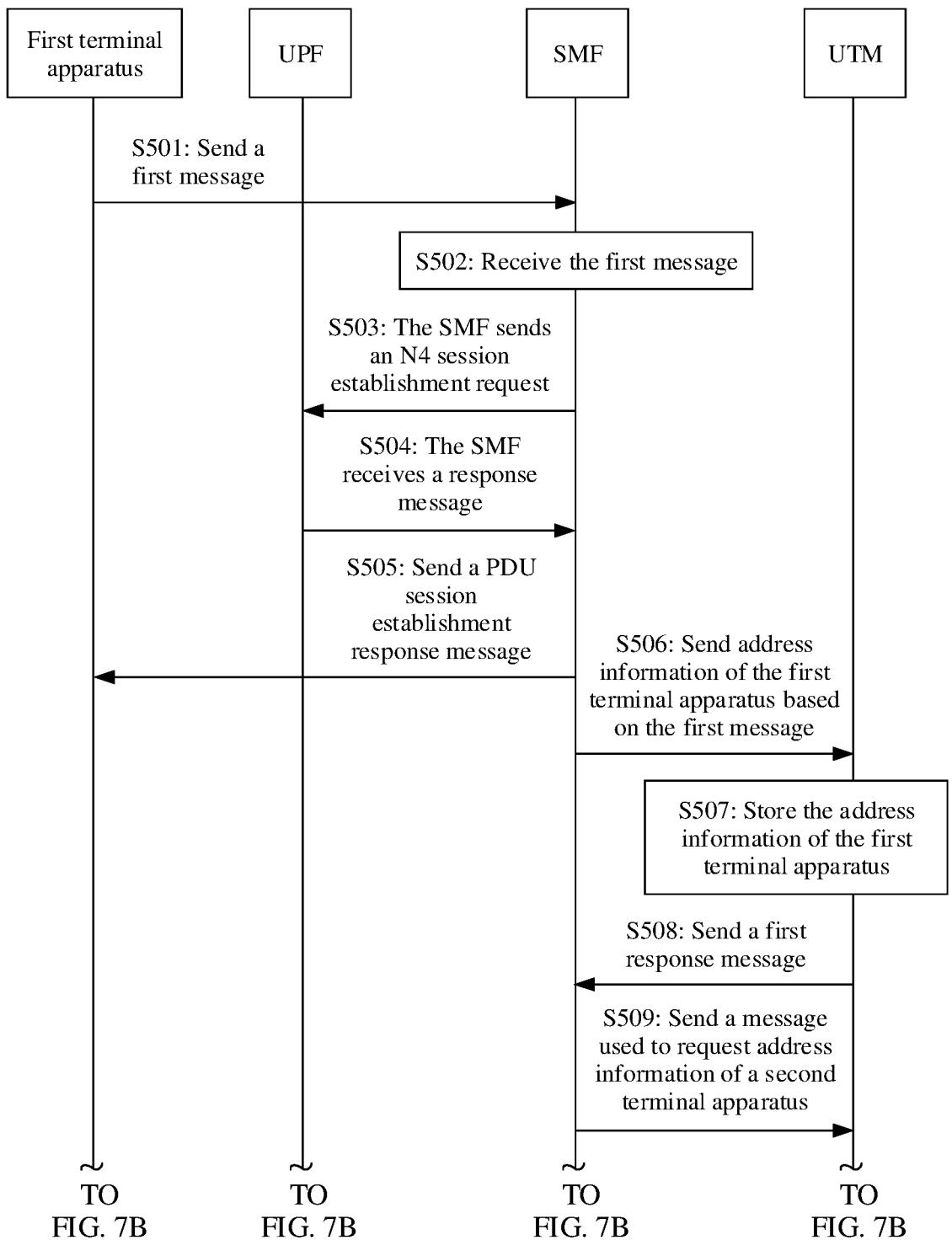
FIG. 7A and FIG. 7B are a schematic flowchart of a communication method according to the embodiments.
Figure 7B:
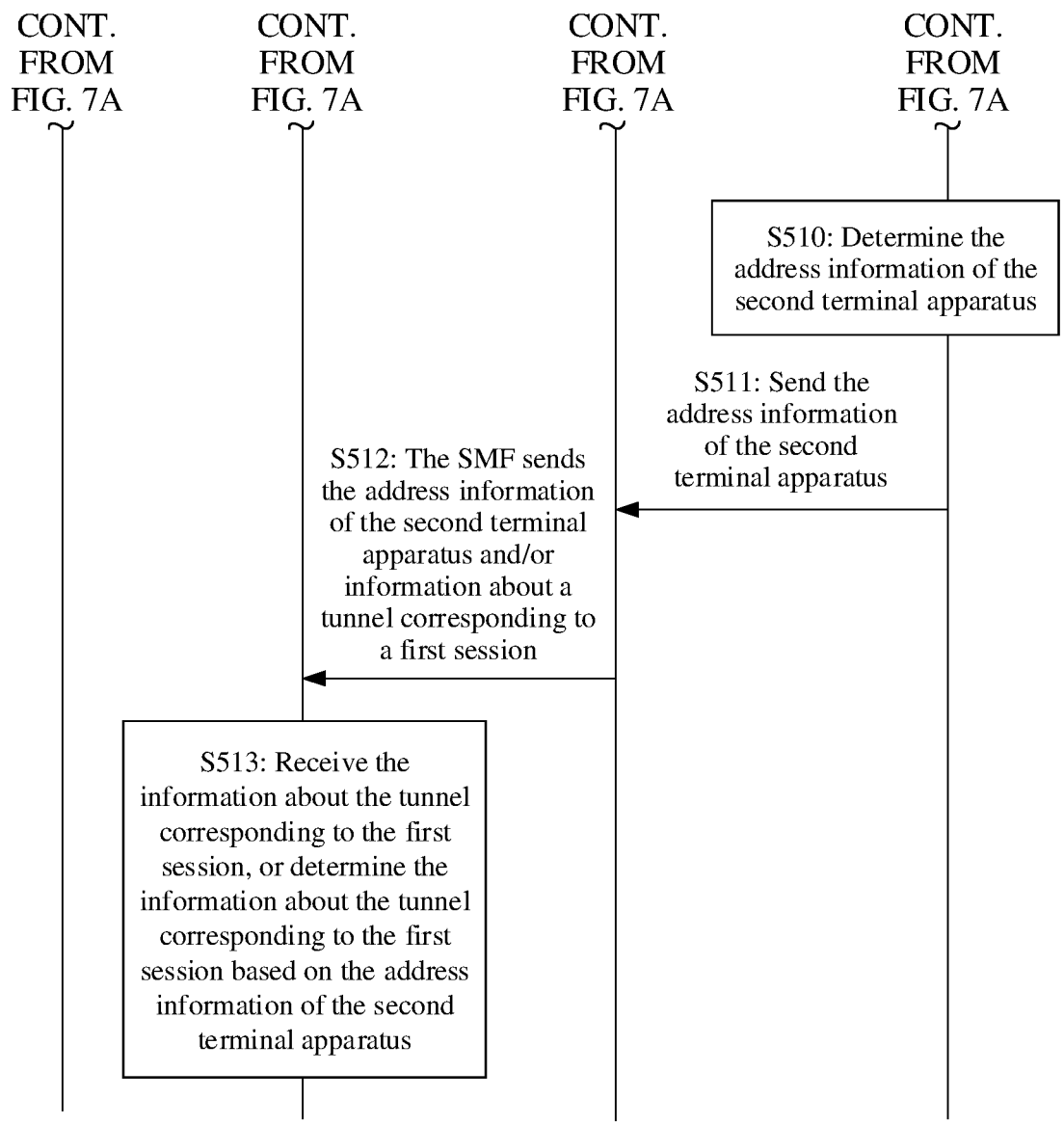

The following describes, with reference to FIG. 7A and FIG. 7B, a procedure of a communication method according to an embodiment is described. The procedure includes the following steps.

S501: A first terminal apparatus sends a first message to an SMF, where the first message is used to request the SMF to establish a first session for the first terminal apparatus, the first message is further used to indicate that the first session is used for communication between the first terminal apparatus and a second terminal apparatus, and the first terminal apparatus and the second terminal apparatus belong to a same unmanned aerial vehicle communication system. The first message may carry information used to indicate that the first session is used for the communication between the first terminal apparatus and the second terminal apparatus in the same unmanned aerial vehicle communication system. The first message may further carry an identifier of the second terminal apparatus.

S502: The SMF receives the first message.

S503. The SMF sends an N4 session establishment request to a UPF corresponding to the first terminal apparatus. The N4 session establishment request may carry the information used to indicate that the first session is used for the communication between the first terminal apparatus and the second terminal apparatus in the same unmanned aerial vehicle communication system.

S504: The SMF receives a response message from the UPF corresponding to the first terminal apparatus, where the response message indicates that establishment of an N4 session between the SMF and the UPF is completed.

S505: The SMF sends a PDU session establishment response message to the first terminal apparatus based on the first message, to indicate that establishment of the first session is completed.

S506: The SMF sends address information of the first terminal apparatus to a UTM based on the first message, so that the UTM stores the address information of the first terminal apparatus.

S507: The UTM receives and stores the address information of the first terminal apparatus. If the UTM previously receives a message that is sent by an SMF that manages the second terminal apparatus and/or a UPF corresponding to the second terminal apparatus and that is used to subscribe to the address information of the first terminal apparatus, after S507, the UTM may send the address information of the first terminal apparatus to the SMF that manages the second terminal apparatus and/or the UPF corresponding to the second terminal apparatus.

S508: The UTM sends a first response message to the SMF, where the first response message is used to indicate that the UTM has stored the address information of the first terminal apparatus.

S509: The SMF sends a message used to request address information of the second terminal apparatus to the UTM. The message may include the identifier of the second terminal apparatus.

S510: The UTM receives the message used to request the address information of the second terminal apparatus and determines the address information of the second terminal apparatus. The UTM may query and determine the address information of the second terminal apparatus from the stored identifier of the terminal apparatus and the stored address information of the terminal apparatus based on the identifier of the second terminal apparatus carried in the message. Alternatively, the UTM may select, according to preconfiguration, at least one terminal apparatus that can perform pairing and connection to the first terminal apparatus from terminal apparatuses to which the stored address information belongs as the second terminal apparatus and use address information of the terminal apparatus as the address information of the second terminal apparatus. If the UTM does not find the address information of the second terminal apparatus, the UTM may perform corresponding feedback to the SMF, or does not perform feedback, so that the SMF determines, after determining that the address information of the second terminal apparatus is not received within preset duration, that the UTM does not find the address information of the second terminal apparatus. In this case, the SMF may send a second message to the UTM, to subscribe to the address information of the second terminal apparatus. After receiving the second message, the UTM may send the address information of the second terminal apparatus to the SMF after storing the address information of the second terminal apparatus.

S511: The UTM sends the address information of the second terminal apparatus to the SMF.

S512: The SMF sends, to the UPF corresponding to the first terminal apparatus, the address information of the second terminal apparatus and/or information that is about a tunnel corresponding to the first session and that is allocated by the SMF. The tunnel is allocated by the SMF based on the address information of the second terminal apparatus, and the tunnel is used for the communication between the first terminal apparatus and the second terminal apparatus.

S513: The UPF receives the information about the tunnel or determines information about a communication tunnel between the first terminal apparatus and the second terminal apparatus based on the address information of the second terminal apparatus.

It should be understood that the steps S506 to S513 may also be completed before S505. A time sequence relationship between the foregoing steps is not limited in the embodiments.

Based on a same concept as the foregoing method embodiments, the embodiments further provide a communication apparatus. The communication apparatus may be configured to implement functions performed by the SMF, the traffic management entity, the first terminal apparatus, or the PCF in the foregoing method embodiments.

Figure 8:
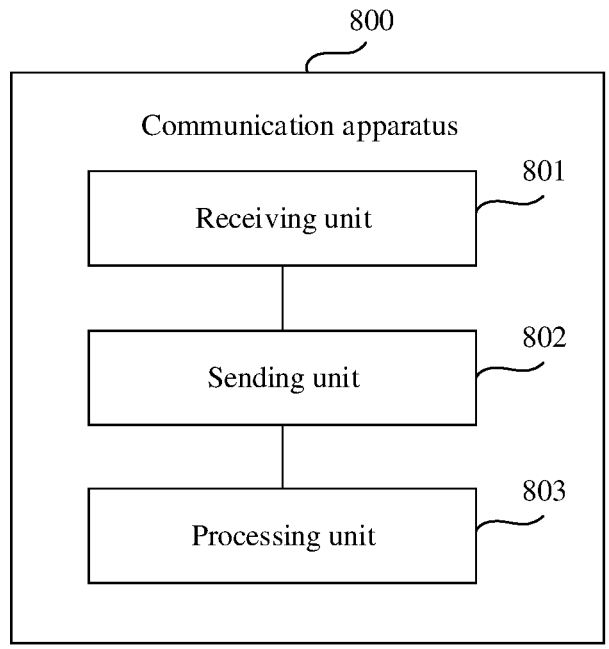
FIG. 8 is a schematic structural diagram of a communication apparatus according to the embodiments.

As shown in FIG. 8, an embodiment further provides a communication apparatus 800 configured to perform an operation performed by an SMF in the foregoing communication method. The communication apparatus 800 may include a receiving unit 801 and a sending unit 802. In addition, the communication apparatus 800 may further include a processing unit 803.

In an implementation, the receiving unit 801 is used to receive a first message from a first terminal apparatus. The first message is used to request the SMF to establish a first session for the first terminal apparatus. The first message is further used to indicate that the first session is used for communication between the first terminal apparatus and a second terminal apparatus. The first terminal apparatus and the second terminal apparatus belong to a same unmanned aerial vehicle communication system. The sending unit 802 may be configured to send address information of the first terminal apparatus to a first management network element based on the first message. The address information of the first terminal apparatus is used to indicate an address of the first terminal apparatus and/or an address of a user plane function UPF corresponding to the first terminal apparatus.

For example, if the first management network element includes a traffic management entity, and after the sending unit 802 sends the address information of the first terminal apparatus to the first management network element, the receiving unit 801 is further configured to receive address information of the second terminal apparatus from the traffic management entity. The address information of the second terminal apparatus is used to indicate an address of the second terminal apparatus and/or an address of a UPF corresponding to the second terminal apparatus.

After the receiving unit 801 receives the address information of the second terminal apparatus from the traffic management entity, the processing unit 803 may be configured to determine a first rule based on the address information of the second terminal apparatus. The sending unit 802 may be configured to send the first rule to the UPF corresponding to the first terminal apparatus. The first rule is used to indicate a routing rule from the first terminal apparatus to the second terminal apparatus and/or a data packet filtering rule between the first terminal apparatus and the second terminal apparatus. Alternatively, the sending unit 802 may be configured to send the address information of the second terminal apparatus to the UPF corresponding to the first terminal apparatus.

Before the receiving unit 801 receives the address information of the second terminal apparatus from the traffic management entity, the sending unit 802 may further send a second message to the traffic management entity. The second message is used to subscribe to the address information of the second terminal apparatus. The second message may include an identifier of the second terminal apparatus.

For example, if the first management network element includes the traffic management entity, the sending unit 802 may further be configured to send an identifier of a policy control function PCF, address information of the PCF, or a portion of or all information of the identifier of the second terminal apparatus to the traffic management entity.

After the sending unit 802 sends the identifier of the policy control function PCF, the address information of the PCF, or a portion of or all information of the identifier of the second terminal apparatus to the traffic management entity, the receiving unit 801 may further be configured to receive a session management policy of the first session from the PCF. The processing unit 803 may further be configured to determine a second rule according to the session management policy of the first session. The second rule is used to indicate the routing rule from the first terminal apparatus to the second terminal apparatus and/or the data packet filtering rule between the first terminal apparatus and the second terminal apparatus. The sending unit 802 may further be configured to send the second rule to the UPF corresponding to the first terminal apparatus.

The first management network element includes the PCF. After the sending unit 802 sends the address information of the first terminal apparatus to the first management network element, the receiving unit 801 may further be configured to receive the session management policy of the first session from the PCF. The processing unit 803 may further be configured to determine the second rule according to the session management policy of the first session. The second rule is used to indicate the routing rule from the first terminal apparatus to the second terminal apparatus and/or the data packet filtering rule between the first terminal apparatus and the second terminal apparatus. The sending unit 802 may further be configured to send the second rule to the UPF corresponding to the first terminal apparatus.

The sending unit 802 may further be configured to send the identifier of the second terminal apparatus to the PCF.

After the receiving unit 801 receives the address information of the second terminal apparatus from the traffic management entity, the processing unit 803 may further be configured to allocate, based on the address information of the second terminal apparatus, a tunnel corresponding to the first session. The sending unit 802 may further be configured to send information about the tunnel to the UPF corresponding to the first terminal apparatus. The tunnel is used for the communication between the first terminal apparatus and the second terminal apparatus.

For example, if the first management network element includes the traffic management entity, the receiving unit 801 may further receive a first response message from the traffic management entity. The first response message is used to indicate that the traffic management entity completes storage of the address information of the first terminal apparatus.

Figure 9:
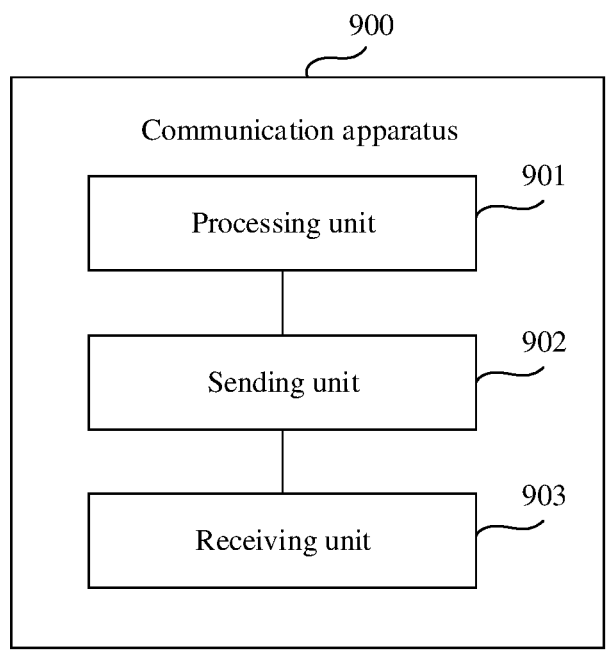
FIG. 9 is a schematic structural diagram of a communication apparatus according to the embodiments.

As shown in FIG. 9, an embodiment further provides a communication apparatus 900, configured to perform an operation performed by the first terminal apparatus in the foregoing communication method. The communication apparatus 900 may include a processing unit 901 and a sending unit 902. In addition, the communication apparatus 900 may further include a receiving unit 903.

In an implementation, the processing unit 901 may be configured to generate a first message. The first message is used to request a session management function SMF to establish a first session for the first terminal apparatus. The first message is further used to indicate that the first session is used for communication between the first terminal apparatus and a second terminal apparatus. The first terminal apparatus and the second terminal apparatus belong to a same unmanned aerial vehicle communication system. The sending unit 902 may be configured to send the first message to the session management function SMF. The first message may include an identifier of the second terminal apparatus.

For example, after the sending unit 902 sends the first message to the session management function SMF, the receiving unit 903 may be configured to receive a response message from the SMF. The response message is used to indicate a result of establishing the first session.

Figure 10:
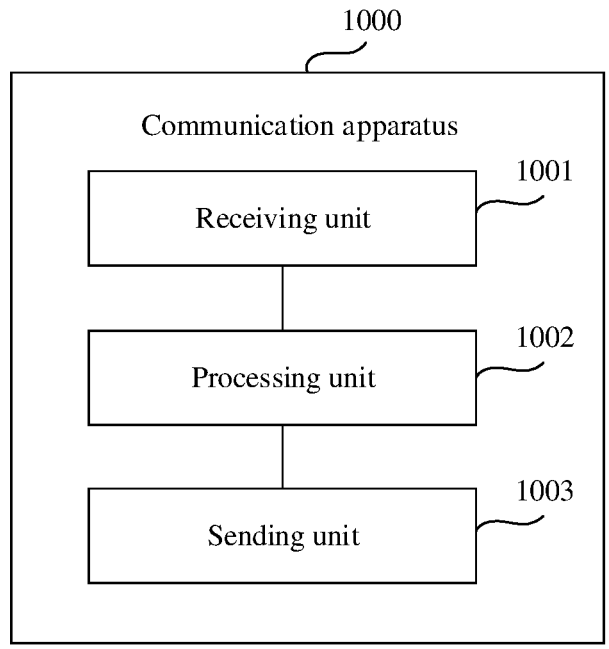
FIG. 10 is a schematic structural diagram of a communication apparatus according to the embodiments.

As shown in FIG. 10, an embodiment further provides a communication apparatus 1000, configured to perform an operation performed by the traffic management entity in the foregoing communication method. The communication apparatus 1000 may include a receiving unit 1001 and a processing unit 1002. In addition, the communication apparatus 1000 may further include a sending unit 1003.

In an implementation, the receiving unit 1001 may be configured to receive address information of a first terminal apparatus from a second management network element. The address information of the first terminal apparatus is used to indicate an address of the first terminal apparatus and/or an address of a user plane function UPF corresponding to the first terminal apparatus. The processing unit 1002 may be configured to store the address information of the first terminal apparatus.

For example, after the processing unit 1002 stores the address information of the first terminal apparatus, the sending unit 1003 may be configured to send the address information of the first terminal apparatus to an SMF that manages a second terminal apparatus. The first terminal apparatus and the second terminal apparatus belong to a same unmanned aerial vehicle communication system.

Before the sending unit 1003 sends the address information of the first terminal apparatus to the SMF that manages the second terminal apparatus, the receiving unit 1001 may further receive a second message from the SMF that manages the second terminal apparatus. The second message is used to subscribe to the address information of the first terminal apparatus. The second message may include an identifier of the first terminal apparatus.

For example, if the second management network element includes an SMF that manages the first terminal apparatus, and after the processing unit 1002 stores the address information of the first terminal apparatus, the sending unit 1003 further sends address information of the second terminal apparatus to the SMF that manages the first terminal apparatus. The first terminal apparatus and the second terminal apparatus belong to the same unmanned aerial vehicle communication system. The address information of the second terminal apparatus is used to indicate an address of the second terminal apparatus and/or an address of a user plane function UPF corresponding to the second terminal apparatus.

Before the sending unit 1003 sends the address information of the second terminal apparatus to the SMF that manages the first terminal apparatus, the receiving unit 1001 may further receive a third message from the SMF that manages the first terminal apparatus. The third message is used to subscribe to the address information of the second terminal apparatus. The third message may include an identifier of the second terminal apparatus.

The receiving unit 1001 may further be configured to receive an identifier of a PCF and/or address information of the PCF from the SMF that manages the first terminal apparatus. After the processing unit 1002 stores the address information of the first terminal apparatus, the sending unit 1003 may send the address information of the second terminal apparatus to the PCF. The address information of the second terminal apparatus is used to indicate the address of the second terminal apparatus and/or the address of the UPF corresponding to the second terminal apparatus. The first terminal apparatus and the second terminal apparatus belong to the same unmanned aerial vehicle communication system.

Before the sending unit 1003 sends the address information of the second terminal apparatus to the PCF, the receiving unit 1001 may further be configured to receive a fourth message from the SMF that manages the first terminal apparatus. The fourth message is used to subscribe to the address information of the second terminal apparatus. The fourth message may include the identifier of the second terminal apparatus.

For example, if the second management network element includes the PCF, after the processing unit 1002 stores the address information of the first terminal apparatus, the sending unit 1003 may further send the address information of the second terminal apparatus to the PCF. The address information of the second terminal apparatus is used to indicate the address of the second terminal apparatus and/or the address of the UPF corresponding to the second terminal apparatus. The first terminal apparatus and the second terminal apparatus belong to the same unmanned aerial vehicle communication system.

Before the sending unit 1003 sends the address information of the second terminal apparatus to the PCF, the receiving unit 1001 may further be configured to receive a fifth message from the PCF. The fifth message is used to subscribe to the address information of the second terminal apparatus. The fifth message may include the identifier of the second terminal apparatus.

Figure 11:
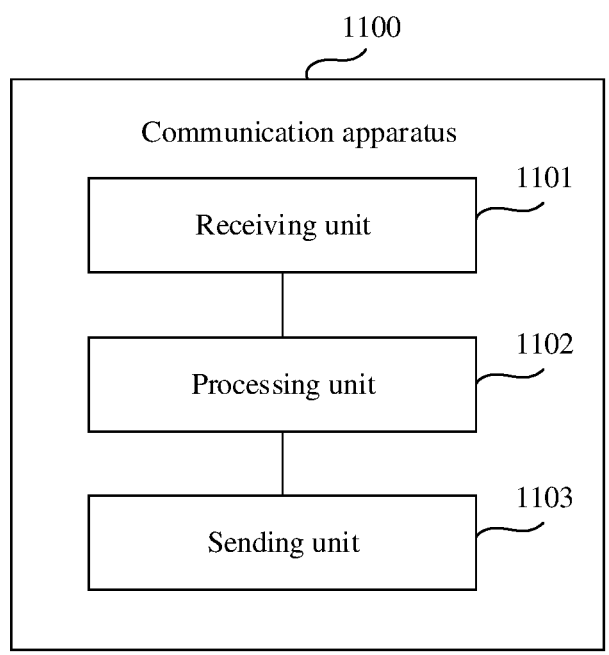
FIG. 11 is a schematic structural diagram of a communication apparatus according to the embodiments.

As shown in FIG. 11, an embodiment further provides a communication apparatus 1100, configured to perform an operation performed by the traffic management entity in the foregoing communication method. The communication apparatus 1100 may include a receiving unit 1101, a processing unit 1102, and a sending unit 1103.

In an implementation, the receiving unit 1101 may be configured to receive address information of a second terminal apparatus from the traffic management entity. The processing unit 1102 may be configured to determine a session management policy of a first session based on address information of the second terminal apparatus. The first session is used for communication between a first terminal apparatus and the second terminal apparatus. The first terminal apparatus and the second terminal apparatus belong to a same unmanned aerial vehicle communication system. The session management policy of the first session may be used to determine a first rule. The first rule is used to indicate a routing rule from the first terminal apparatus to the second terminal apparatus and/or a data packet filtering rule between the first terminal apparatus and the second terminal apparatus. The sending unit 1103 may be configured to send the session management policy of the first session to a session management function SMF that manages the first terminal apparatus.

Before the receiving unit 1101 receives the address information of the second terminal apparatus from the traffic management entity, the receiving unit 1101 may further be configured to receive the address information of the first terminal apparatus from the session management function SMF that manages the first terminal apparatus. Then, the sending unit 1103 may be configured to send the address information of the first terminal apparatus to the traffic management entity.

Before the receiving unit 1101 receives the address information of the second terminal apparatus from the traffic management entity, the sending unit 1103 may further send a request message to the traffic management entity. The request message is used to subscribe to the address information of the second terminal apparatus. The request message may include an identifier of the second terminal apparatus.

Figure 12:
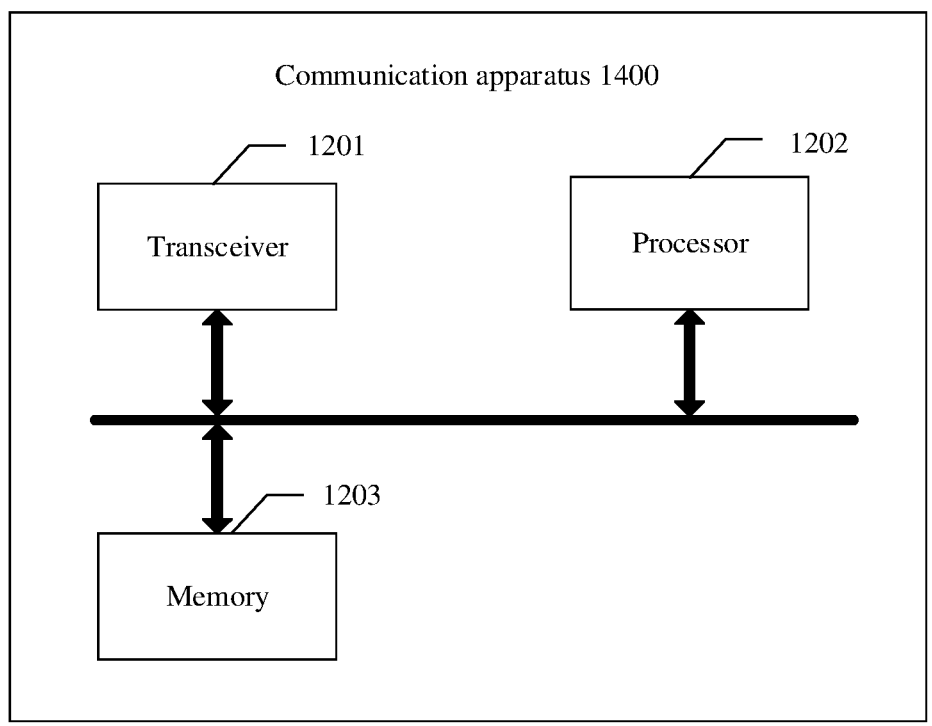
FIG. 12 is a schematic structural diagram of a communication apparatus according to the embodiments.

Based on a same concept as the foregoing method embodiments, as shown in FIG. 12, an embodiment further provides a communication apparatus 1200. The communication apparatus 1200 is configured to implement operations performed by an SMF, a traffic management entity, a first terminal apparatus, or a PCF in the methods provided in the foregoing embodiments. For brief description, a schematic diagram of a possible entity apparatus of each of the foregoing network elements is shown by referencing FIG. 12. It may be understood that FIG. 12 is merely a schematic diagram and may be applied to the foregoing various different network elements and apparatuses. The communication apparatus 1200 may include a transceiver 1201, a processor 1202, and a memory 1203. The transceiver 1201 may support, in a wireless or wired manner, the communication apparatus 1200 in performing communication. For example, the transceiver 1201 may be a wireless transceiver, and may be used by the communication apparatus 1200 to perform receiving and sending through a radio air interface. The transceiver 1201 may also be another communication interface, and is configured to support, by using a wired link, the communication apparatus 1200 in performing communication. For example, the transceiver 1201 may be an optical fiber link interface, an Ethernet interface, a copper wire interface, or the like. The memory 1203 is configured to store a program instruction and data. The processor 1202 may be configured for the communication apparatus 1200 to invoke and execute the program instruction in the memory 1203. When the program is executed, the processor 1202 performs an operation performed by the SMF, the traffic management entity, the first terminal apparatus, or the PCF in the method provided in the foregoing embodiment. It should be understood that corresponding steps performed by the sending unit (for example, the sending unit 802, the sending unit 902, the sending unit 1003, or the sending unit 1103) and the receiving unit (the receiving unit 801, the receiving unit 903, the receiving unit 1001, or the receiving unit 1101) in FIG. 8 to FIG. 11 may be implemented by the transceiver 1201. Corresponding steps performed by the processing units (the processing unit 803, the processing unit 901, the processing unit 1002, or the processing unit 1102) in FIG. 8 to FIG. 11 may be implemented by the processor 1202 by invoking the program instruction stored in the memory 1203. For brevity, steps that can be performed by the transceiver 1201 and the processor 1202 are not described herein again. For this step, refer to the descriptions of the corresponding units in FIG. 8 to FIG. 11.

It should be understood that the processor 1202 in the embodiments may be a central processing unit (CPU), a network processor (NP), or a combination of a CPU and an NP. The memory 1203 may be a random-access memory (RAM), a read-only memory (ROM), or the like.

Based on a same concept as the foregoing method embodiments, the embodiments further provides a computer program product. When the computer program product is invoked and executed by a computer, the computer can implement an operation performed by the SMF, the traffic management entity, the first terminal apparatus, or the PCF in the foregoing method embodiments in any possible implementation of the foregoing method embodiments or the method embodiments.

Based on the same concept as the foregoing method embodiments, the embodiments further provide a chip or a chip system. The chip is coupled to a transceiver and is configured to implement the operation performed by the SMF, the traffic management entity, the first terminal apparatus, or the PCF in the foregoing method embodiments in any possible implementation of the foregoing method embodiments or the method embodiments. "Coupling" means that two components are directly or indirectly combined with each other, this combination may be fixed or movable, and may allow communication of a fluid, electricity, an electrical signal, or another type of signal between the two components. The chip system may include the chip.

Based on the same concept as the foregoing method embodiments, the embodiments further provide a communication system. The communication system may be configured to implement the operation performed by the SMF, the traffic management entity, the first terminal apparatus, or the PCF in the foregoing method embodiments in any possible implementation of the foregoing method embodiments or the method embodiments. For example, the communication system has a structure shown in FIG. 1.

The embodiments are described with reference to flowcharts and/or block diagrams of the method, the apparatus, and the computer program product in the embodiments. It should be understood that a computer program instruction may be used to implement each process and/or each block in the flowcharts and/or the block diagrams and a combination of a process and/or a block in the flowcharts and/or the block diagrams. The computer program instruction may be provided for a general-purpose computer, a specific-purpose computer, an embedded processor, or a processor of any other programmable data processing device to generate a machine, so that the instruction executed by a computer or a processor of any other programmable data processing device generates an apparatus for implementing a specific function in one or more processes in the flowcharts and/or in one or more blocks in the block diagrams.

The computer program instruction may be stored in a computer-readable memory that can indicate the computer or another programmable data processing device to work in a specific manner, so that the instruction stored in the computer-readable memory generates an artifact that includes an instruction apparatus. The instruction apparatus implements the specific function in one or more processes in the flowcharts and/or in one or more blocks in the block diagrams.

The computer program instruction may be loaded onto the computer or another programmable data processing device, so that a series of operations and steps are performed on the computer or the another programmable device, thereby generating computer-implemented processing. Therefore, the instruction executed on the computer or another programmable device provides a step for implementing the specific function in one or more processes in the flowcharts and/or in one or more blocks in the block diagrams.

What is claimed is:

1. A communication method, comprising:
receiving, by a session management function, a first message from a first terminal apparatus, wherein the first message is used to request the session management function to establish a first session for the first terminal apparatus, the first message is further used to indicate that the first session is used for communication between the first terminal apparatus and a second terminal apparatus, wherein the first message comprises an identifier of the second terminal apparatus;
sending, by the session management function, a second message including the identifier of the second terminal apparatus to a first management network element;
receiving, by the session management function, address information of the second terminal apparatus from the first management network element;
determining, by the session management function, a rule according to the address information of the second terminal apparatus, wherein the rule is used to indicate a routing rule from the first terminal apparatus to the second terminal apparatus and/or a data packet filtering rule between the first terminal apparatus and the second terminal apparatus; and sending, by the session management function, the rule to a user plane function corresponding to the first terminal apparatus for supporting communication between the first terminal apparatus and the second terminal apparatus by performing routing and/or data packet flow identification according to the rule at the user plane function.

2. The communication method according to claim 1, wherein the first terminal apparatus and the second terminal apparatus belong to a same unmanned aerial vehicle communication system.

3. A communication system, comprising a session management function (SMF) and a first management network element,
wherein the session management function is configured to:
receive a first message from a first terminal apparatus, wherein the first message is used to request the session management function to establish a first session for the first terminal apparatus, the first message is further used to indicate that the first session is used for communication between the first terminal apparatus and a second terminal apparatus, wherein the first message comprises an identifier of the second terminal apparatus;
send a second message including the identifier of the second terminal apparatus to the first management network element;
receive address information of the second terminal apparatus sent by the first management network element;
determine a rule according to the address information of the second terminal apparatus, wherein the rule is used to indicate a routing rule from the first terminal apparatus to the second terminal apparatus and/or a data packet filtering rule between the first terminal apparatus and the second terminal apparatus; and
send the rule to a user plane function corresponding to the first terminal apparatus for supporting communication between the first terminal apparatus and the second terminal apparatus by performing routing and/or data packet flow identification according to the rule at the user plane function;
wherein the first management network element is configured to:
receive the second message; and
send the address information of the second terminal apparatus to the session management function.

4. The communication system according to claim 3, wherein the first terminal apparatus and the second terminal apparatus belong to a same unmanned aerial vehicle communication system.

5. The communication method according to claim 1, further comprising:
sending, by the session management function, address information of the first terminal apparatus to the first management network element based on the first message, wherein the address information of the first terminal apparatus indicates an address of the first terminal apparatus.

6. The communication method according to claim 5, further comprising:
storing, by the first management network element, the address information of the first terminal apparatus.

7. The communication method according to claim 1, further comprising:
receiving, by the first management network element, the second message; and sending, by the first management network element, the address information of the second terminal apparatus to the session management function.

8. The communication system according to claim 3, wherein the session management function is configured to:
send address information of the first terminal apparatus to the first management network element based on the first message, wherein the address information of the first terminal apparatus indicates an address of the first terminal apparatus; and
the first management network element is further configured to:
receive the address information of the first terminal apparatus.

9. The communication system according to claim 8, wherein the first management network element is further configured to:
store the address information of the first terminal apparatus.

10. A communication apparatus, comprising:
a memory, and
a processor, wherein
the memory is configured to store a computer program; and
the processor is configured to invoke the computer program from the memory and run the computer program to:
receive a first message from a first terminal apparatus, wherein the first message is used to request the communication apparatus to establish a first session for the first terminal apparatus, the first message is further used to indicate that the first session is used for communication between the first terminal apparatus and a second terminal apparatus, wherein the first message comprises an identifier of the second terminal apparatus;
send a second message including the identifier of the second terminal apparatus to the first management network element;
receive address information of the second terminal apparatus from the first management network element;
determine a rule according to the address information of the second terminal apparatus, wherein the rule is used to indicate a routing rule from the first terminal apparatus to the second terminal apparatus and/or a data packet filtering rule between the first terminal apparatus and the second terminal apparatus; and
send the rule to a user plane function corresponding to the first terminal apparatus for supporting communication between the first terminal apparatus and the second terminal apparatus by performing routing and/or data packet flow identification according to the rule at the user plane function.

11. The communication apparatus according to claim 6, wherein the processor is further configured to invoke the computer program from the memory and run the computer program to:
send address information of the first terminal apparatus to the first management network element based on the first message, wherein the address information of the first terminal apparatus indicates an address of the first terminal apparatus.

12. The communication apparatus according to claim 6, wherein the first terminal apparatus and the second terminal apparatus belong to a same unmanned aerial vehicle communication system.

13. A communication method, comprising:
- receiving, by the first management network element, address information of first terminal apparatus from a session management function, wherein the address information of the first terminal apparatus indicates an address of the first terminal apparatus;
- receiving, by the first management network element, a second message including identifier of second terminal apparatus from the session management function, wherein a first session is to be established for communication between the first terminal apparatus and the second terminal apparatus; and
- sending, by the first management network element, address information of the second terminal apparatus to the session management function.

14. The communication method according to claim 13, further comprising:
- storing, by the first management network element, the address information of the first terminal apparatus.

15. A communication apparatus, comprising a memory, and a processor, wherein
- the memory is configured to store a computer program; and
- the processor is configured to invoke the computer program from the memory and run the computer program to:
- receive address information of first terminal apparatus from a session management function, wherein the address information of the first terminal apparatus indicates an address of the first terminal apparatus;
- receive a second message including identifier of second terminal apparatus from the session management function, wherein a first session is to be established for communication between the first terminal apparatus and the second terminal apparatus; and
- send address information of the second terminal apparatus to the session management function.

16. The communication apparatus according to claim 15, wherein the processor is configured to invoke the computer program from the memory and run the computer program to:
- store the address information of the first terminal apparatus.

* * * * *